United States Patent Office 3,201,393
Patented Aug. 17, 1965

3,201,393
3-KETO-5',6'-DIHYDRO ANDROSTANE - [17,16α - c]-PYRANS AND COMPOUNDS PRODUCED THEREFROM
John E. Pike, Kalamazoo, Mich., assignor to The Upjohn Company, Kalamazoo, Mich., a corporation of Michigan
No Drawing. Original application Jan. 31, 1962, Ser. No. 170,262. Divided and this application June 15, 1964, Ser. No. 375,346
14 Claims. (Cl. 260—239.55)

This application is a division of my application Serial No. 170,262, filed January 31, 1962, now abandoned.

This invention relates to novel heterocyclic derivatives of steroids and to a process for their preparation, and is more particularly concerned with novel androstano-[17,16 - c]-pyrans, 5',6' - dihydroandrostano - [17,16 - c]-pyrans, and related compounds, and with a process for their preparation.

The present invention, in its broadest aspect, consists in a process which comprises reacting a steroid of the pregnane series having in ring D the configuration:

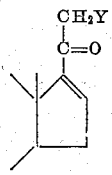

wherein Y is selected from the class consisting of hydrogen and acyloxy, the acyl radical of the acyloxy being that of a hydrocarbon carboxylic acid containing from 1 to 12 carbon atoms, inclusive, with a dienophile under Diels-Alder reaction conditions are hereinafter described.

The term "dienophile" is well-known in the art (see, for example, Cram and Hammond, Organic Chemistry, p. 350, McGraw-Hill, New York, 1959) and is used to designate an organic unsaturated compound capable of condensing with a diene by 1,4-addition to produce a six-member ring. The process of the invention can be presented schematically as follows:

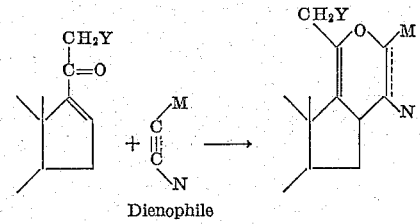
Dienophile

The dienophile is represented above in the simplest possible terms, the dotted line joining the carbon atoms of the unsaturated linkage serving to indicate that this linkage can be a double bond or a triple bond, and the symbols M and N representing hydrogen or organic radicals necessary to complete the otherwise unattached valencies of the carbon atoms comprising the unsaturated linkage. The product of the condensation contains a six-membered heterocyclic ring, namely a pyran ring wherein the carbon atoms derived from the dienophile are linked by a single bond where the dienophile contained a double bond, or by a double bond where the dienophile contained a triple bond.

While the process of the invention is of general application to the condensation of a $\Delta^{16}$-20-ketosteroid of the pregnane series with any dienophile using the reaction conditions to be described in detail hereinafter, it is of particular value in the condensation of a $\Delta^{16}$-20-keto-steroid having the ring D configuration set forth above and a dienophile selected from the class consisting of

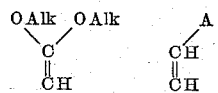

and

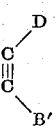

wherein Alk represents lower alkyl, A is selected from the class consisting of lower-alkoxy, aryloxy, lower-alkanoyloxy, aldehydo, lower-alkanoyl, formyloxy, nitro, halo, mercapto, lower-alkylmercapto, and arylmercapto, B is selected from the class consisting of hydrogen and lower-alkyl, A and B taken together represent the radical

B' is selected from the class consisting of hydrogen, lower-alkyl, and lower-alkanoyloxy, and D is selected from the class consisting of lower-alkoxy and lower-alkanoyloxy. The reaction products so obtained are androstano-[17,16-c]-pyrans having the following configurations in ring D, the formulae being written in the same order as used above for the dienophiles from which they are obtained:

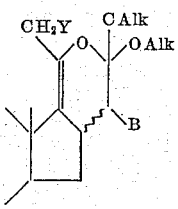

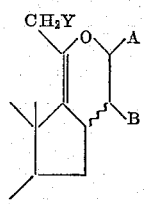

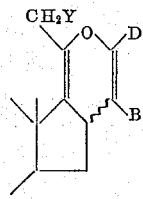

wherein Alk, A, B, B', D and Y have the significance hereinbefore defined.

The term "lower-alkoxy" means an alkoxy radical containing from 1 to 8 carbon atoms, inclusive, such as methoxy, ethoxy, propoxy, butoxy, amyloxy, hexyloxy, heptyloxy, octyloxy, and isomeric forms thereof. The term "aryloxy" means an aryloxy radical containing from 6 to 12 carbon atoms, inclusive, such as phenoxy, tolyloxy (o, m, and p), xylyloxy (o, m, and p), and the like.

The term "lower-alkanoyloxy" means an alkanoyloxy radical containing from 2 to 8 carbon atoms, inclusive, such as acetoxy, propionyloxy, butyryloxy, valeryloxy, caproyloxy, heptyloxy, caprylyloxy, and isomeric forms thereof. The term "lower-alkanoyl" means an alkanoyl radical containing from 2 to 8 carbon atoms, inclusive, such as acetyl, propionyl, butyryl, valeryl, caproyl, heptylyl, caprylyl, and isomeric forms thereof. The term "lower-alkylmercapto" means an alkylmercapto radical containing from 1 to 8 carbon atoms, inclusive, such as methylmercapto, ethylmercapto, propylmercapto, butylmercapto, amylmercapto, hexylmercapto, heptylmercapto, octylmercapto, and isomeric forms thereof. The term "arylmercapto" means an arylmercapto radical containing from 6 to 12 carbon atoms, inclusive, such as phenylmercapto, o-, m-, and p-tolylmercapto, o-, m-, and p-xylylmercapto, biphenylylmercapto, and the like.

Examples of hydrocarbon carboxylic acids employed in the formation of the acylates of the invention, include saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic acid, succinic, glutaric, dimethylglutaric, maleic, cyclopentylpropionic acids, and the like.

Advantageously, the process of the invention is carried out under conditions normally employed in Diels-Alder reactions, i.e., the condensation of a dienophile with an $\alpha,\beta$-unsaturated ketone. Such procedures are described by, for example, Longley and Emerson, J. Am. Chem. Soc., 72, 3079, 1950; Parham and Holmquist, ibid., 73, 913, 1951; Smith et al., ibid., 73, 5267, 1961; Emerson et al., ibid, 75, 1312, 1953; Korte et al., Tetrahedron, 6, 201, 1959; Ansell and Gadsby, J. Chem. Soc. 3388, 1958; Brannock, J. Org. Chem., 25, 258, 1960.

Thus, the process of the invention can be carried out by bringing the reactants together, advantageously in the presence of a catalyst at a temperature within the range of about 25° C. to about 300° C. Preferably the reaction temperature is within the range of about 150° C. to 250° C. When operating in the higher range of temperatures and employing a dienophile which is highly volatile at said temperatures it is generally necessary to conduct the reaction in a sealed vessel.

The dienophile is present advantageously in excess of equimolar proportions with respect to the starting $\Delta^{16}$-steroid and preferably the dienophile is present in substantial excess of this amount. Advantageously the excess of dienophile serves as solvent for the reaction mixture and no other solvent need be used. However, an additional solvent can be present, if desired. Suitable solvents for this purpose are inert organic solvents such as benzene, xylene, toluene, nitrobenzene, dioxane, ether, ethanol, ethylenedichloride, acetic acid, cyclohexane, and the like.

The reaction between the $\Delta^{16}$-steroid and the dienophile is substantially complete in a time ranging from minutes to many hours according to the temperature at which the reaction is carried out. Generally speaking, at reaction temperatures of the order of about 200° C., the reaction is substantially complete in a time of the order of about 15 to about 30 hours.

Any of the catalysts normally employed in Diels-Alder type condensations (see supra) can be used in the process of the invention. Such catalysts include hydroquinone, aluminum chloride, boron trifluoride, stannic chloride, ferric chloride, titanium tetrachloride, and the like. The preferred catalyst for use in the process of the invention is hydroquinone since this catalyst serves to inhibit polymerization of the dienophile which polymerization can occur as a side reaction.

The desired androstano-[17,16-c]-pyran can be isolated from the reaction mixture, produced by the process of the invention, using conventional procedures. For example, the excess dienophile and any other solvent, if present, can be removed by distillation and the residual crude product can be purified by conventional procedures such as crystallization, chromatography, countercurrent distribution, and the like, or any combination of these procedures. Using a dienophile containing a triple bond, the process of the invention gives rise to a mixture of the $16\alpha$- and $16\beta$-epimers of the androstano-[17,16-c]-pyran. Using a dienophile containing a double bond, the process of the invention gives rise to a mixture of the $16\alpha,6'\alpha$-, $16\beta,6'\alpha$, $16\alpha,6'\beta$- and $16\beta,6'\beta$-epimers of the androstano-[17,16-c]-pyran (see the structural formula below). These mixtures can be separated into the individual components by conventional procedures such as chromatography, countercurrent distribution and the like, or any combination of these steps.

The products produced by the process of the invention are heterocyclic steroids of a novel type not hitherto described. These products all contain the following basic configuration which also shows the system of numbering employed through the specification:

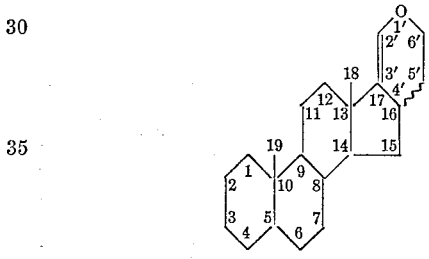

The products obtained using a dienophile containing a double bond possess a single bond between carbon atoms 5' and 6' in the pyran ring and are designated 5',6'-dihydroandrostano-[17,16-c]-pyrans. The products obtained using a dienophile containing a triple bond possess a double bond between carbon atoms 5' and 6' in the pyran ring and are designated androstano-[17,16-c]-pyrans.

The process of the invention can be applied to any $\Delta^{16}$-20-keto-steroid of the pregnane series to produce the corresponding androstano-[17,16-c]-pyran or 5',6'-dihydroandrostano-[17,16-c]-pyran. The starting $\Delta^{16}$-20-keto-steroid can contain substituents such as keto-hydroxy, acyloxy, alkoxy, alkyl, halo, and the like, in the A, B, and C rings. Where hydroxyl is present as a substituent it is desirable to protect said group by conversion to acyloxy or alkoxy before submitting said compound to the process of the invention. The free hydroxy group can be regenerated by conventional procedures of hydrolysis or de-etherification after the process of the invention has been completed.

The compounds produced by the process of the invention possess pharmacological activity and can be employed as anti-inflammatory, progestational, central nervous system regulating, glucocorticoid, antihormonal, lipid-mobilizing, hypotensive, cardiotonic, cholesterol-lowering and anti-fertility agents.

In addition the compounds produced by the process of the invention are all useful as intermediates in the preparation of the corresponding 16-methyl steroids using the reaction procedure to be described hereinafter. As will be seen from the specific examples given below, this makes the compounds produced by the process of the invention useful in providing an alternate and economically attractive route to valuable 16-methylsteroids including those which are already employed clinically in human and veterinary medicine.

While the process of the invention is of wide general applicability as shown above, it is of particular value in the preparation of compounds having the following formulae:

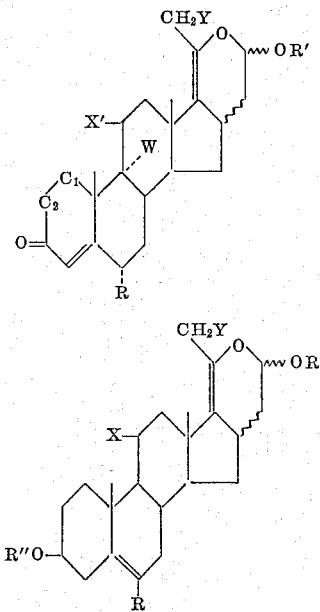

and

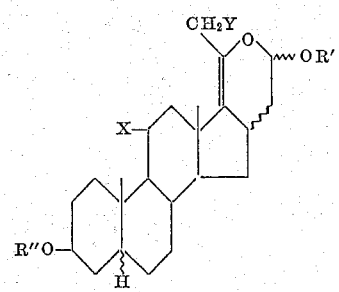

wherein R is selected from the class consisting of hydrogen and methyl, R' is lower-alkyl, R" is selected from the class consisting of hydrogen and the acyl radical of a hydrocarbon carboxylic acid containing from 1 to 12 carbon atoms, inclusive, W is selected from the class consisting of hydrogen and fluorine, X' is an 11-substituent selected from hydrogen, keto, α- and β-hydroxy, and X' and W taken together represent a 9(11)-double bond, X is an 11-substituent selected from the class consisting of hydrogen, keto, α-hydroxy, β-hydroxy, and a 9,11-double bond, Y is selected from the class consisting of hydrogen, hydroxy and acyloxy wherein acyl is as hereinbefore defined, and $-C_1-C_2-$ is a divalent radical selected from the class consisting of $-CH_2-CH_2-$ and $-CH=CH-$. The wavy line employed in the above formulae and throughout the specification is a generic expression indicating the α-isomer, the β-isomer or mixtures thereof.

The compounds of the Formulae I, II and III above are novel compounds possessing anti-inflammatory, progestational, central nervous system regulating, glucocorticoid, anti-hormonal, lipid-mobilizing, hypotensive, cardiotonic, cholesterol-lowering and anti-fertility activity.

The compounds of the Formulae I, II and III above can be prepared and administered to mammals, including humans and valuable domestic animals, and to birds, in a wide variety of oral or parenteral dosage forms, singly, or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

In addition to their use as physiologically and pharmacologically active agents the compounds of the Formulae I, II and III above are useful as intermediates in the synthesis of other useful steroids. Thus the compounds of Formulae I, II and III are intermediates in the preparation of a range of novel 16-substituted pregnanes including 16-methyl and 16-ethyl substituted pregnanes, many of which are already known.

Illustratively, the compounds of Formulae I, II and III can be subjected to hydrolysis in the presence of acids such as mineral acids, p-toluenesulfonic acid, and the like, preferably at room temperature, i.e., of the order of 25° C. or at moderately elevated temperatures, to produce the corresponding 16-(2-oxoethyl)-20-ketopregnanes. The latter compounds can then be decarbonylated to the corresponding 16-methyl-20-ketopregnanes by treatment with a catalyst such as palladium-on-charcoal. The decarbonylation is effected by heating the carbonyl steroid with the catalyst at elevated temperatures, advantageously of the order of 200° C. for a short period and isolating the desired product by conventional procedures, for example, by chromatography.

The above sequence of reactions is set out schematically below:

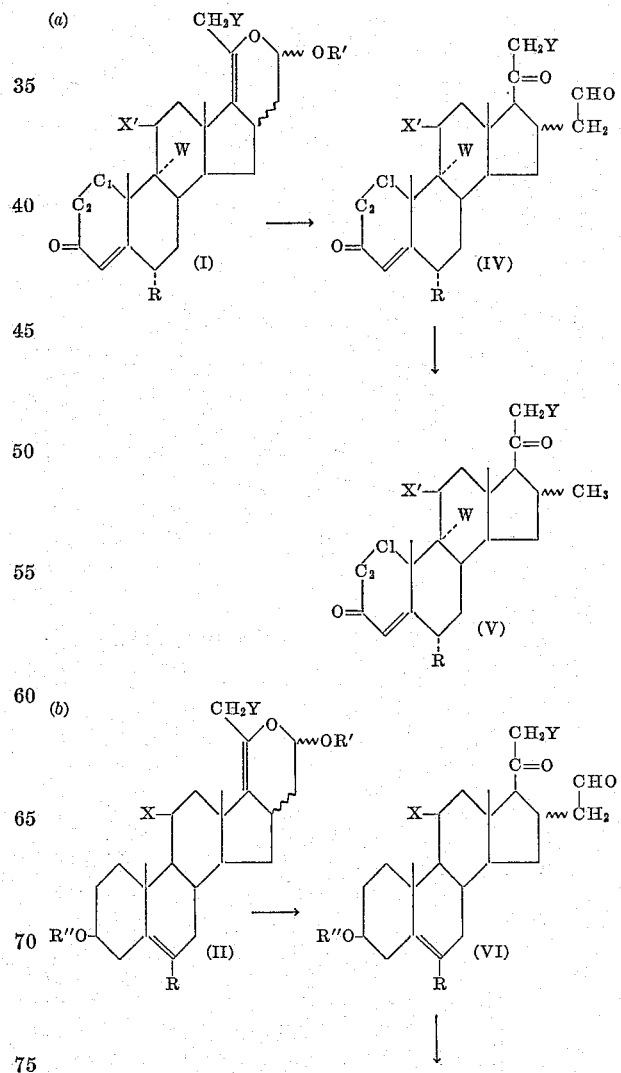

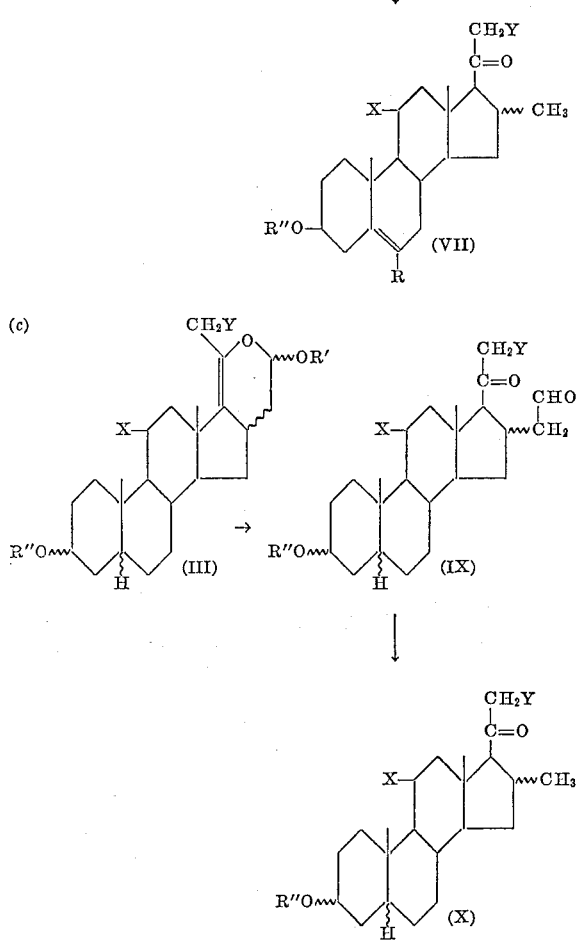

In the above formulae R, R', R", W, X', X, Y and —C₁—C₂— have the significance hereinbefore defined.

The compounds having the Formulae V, VII and X so obtained, many of which are known compounds, exhibit physiological activity as anti-inflammatory, progestational, glucocorticoid, mineralocorticoid, and central nervous system regulating agents. In addition, these compounds are useful as intermediates in the preparation of other physiologically active steroids. Illustratively, the compounds of the Formula V wherein the 16-methyl is in the α-configuration, Y is a hydrogen and —C₁—C₂— is a single bond can be converted to the known anti-inflammatory agents 6α,16α-dimethylcortisone, 6α,16α-dimethylhydrocortisone and 21-acylates and the 9α-fluoro analogues thereof by introduction of the cortical side-chain using the procedures set forth in U.S. Patents 2,790,814, 2,781,343, 2,769,825, and 2,769,823 for the conversion of 11-ketoprogesterone to hydrocortisone, cortisone and their esters. The 6α,16α-dimethylcortisone and 6α,16α-dimethylhydrocortisone and 21-acylates and 9α-fluoro analogues thereof can be converted to the known Δ¹-analogues thereof using conventional procedures such as by treatment with a 1-dehydrogenating microorganism, for example, of the genus Septomyxa, using procedures such as that described in U.S. Patent 2,897,218.

The 1-dehydrogenation can also be effected chemically for example, by treatment with selenium dioxide, using procedures such as that described by Meystre et al., Helv. Chim. Acta 39, 734 (1956).

It will be seen from the above illustration that the above conversion products of the compounds of the invention provide a novel route to known 16-methyl steroids of recognized usefulness.

The compounds of the invention having the Formulae I, II and III are also useful as intermediates in the preparation of novel lactones and lactols. Thus the compounds of the Formulae I, II or III can be reacted in the presence of an inert solvent such as tetrahydrofuran, dioxane, ether, benzene, acetic acid, chloroform, acetone, and the like, with an oxidizing agent such as osmium tetroxide, potassium permanganate and the like, or with an oxidizing agent such as peracetic acid, perphthalic acid, and the like, followed by hydrolysis, to obtain a mixture of the lactone of the corresponding 17-hydroxy-20-ketopregnane-16-acetic acid, the lactone of the corresponding 17,20-dihydroxypregnane-16-acetic acid, and the lactol (cyclic hemiacetal) of the corresponding 16-(2-oxoethyl-17-hydroxysteroid. The composition of the reaction product from the oxidation varies according to the length of time for which the oxidation is allowed to proceed. With oxidation periods of only a few hours the 17,20-dihydroxypregnane-16-acetic acid lactone and the 16-(2-oxoethyl)-17-hydroxysteroid lactol are the principal products whereas at longer oxidation times the third product is also formed.

The reaction is preferably conducted at or about room temperature, i.e., at or about 25° C. Advantageously, the oxidizing agent is present in an amount in excess of that theoretically required. When the reaction is complete the excess oxidizing agent is destroyed by the addition of a reducing agent such as hydrogen sulphide, sodium bisulphite, and the like. The resulting mixture of lactones and lactol can be separated by conventional procedures, for example, by fractional crystallization, chromatography, counter-current distribution, and the like, or any combination of these procedures. The lactol so obtained can be converted to the corresponding lactone by oxidation using an oxidizing agent such as chromic acid, sodium dichromate, and the like. The 16α-epimers of the starting materials I, II and III in general give rise almost exclusively to the 16α-epimers of the lactones and lactols and the 16β-epimers of the starting materials give rise almost exclusively to the 16β-epimers of the 16-(2-oxoethyl) and 16-carboxymethyl derivatives.

The above oxidations are illustrated schematically as follows:

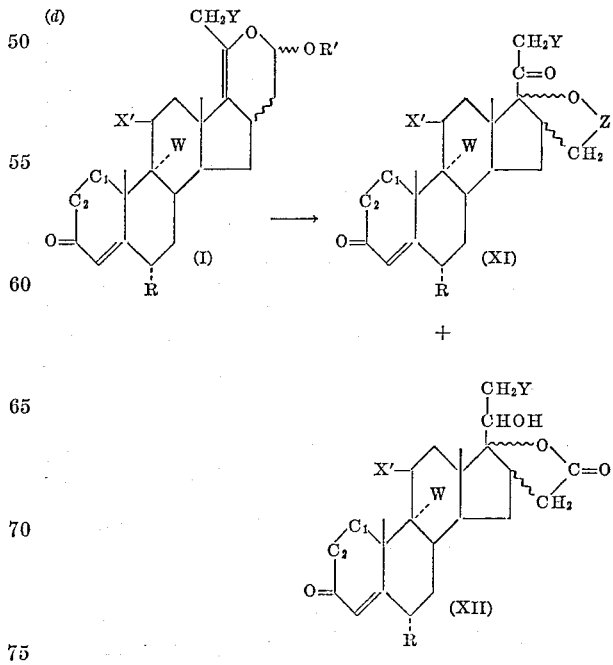

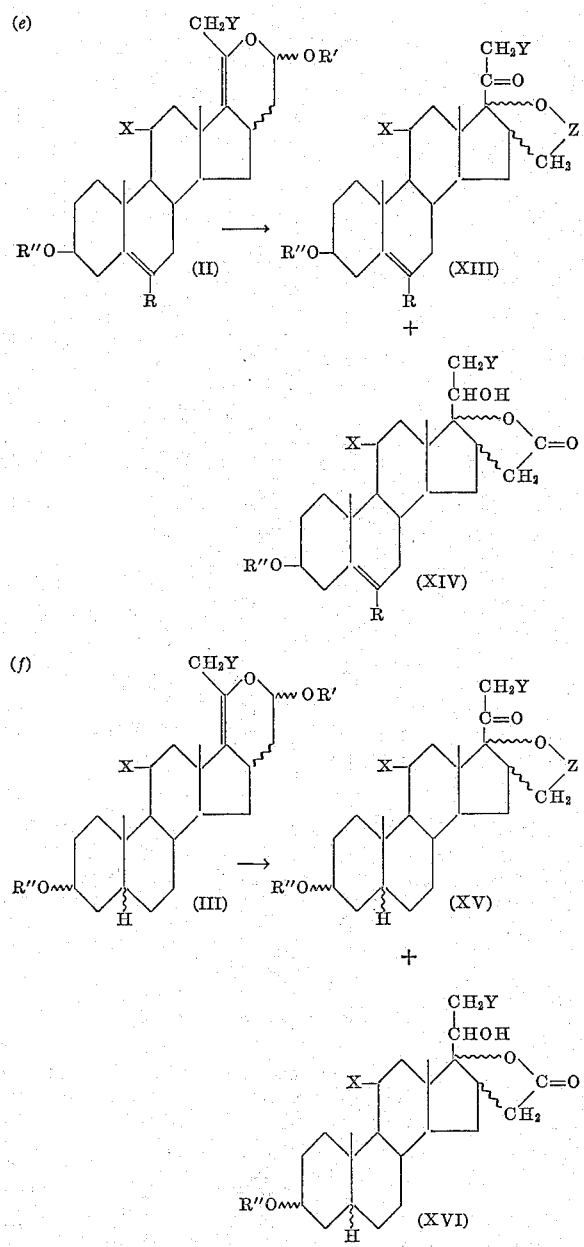

In the above formulae R, R', R", W, X', X, Y, and —C₁—C₂— have the significance hereinbefore defined, and Z is selected from the class consisting of hydroxymethylene, and carbonyl.

The compounds (XI), (XII), (XIII), (XIV), (XV) and (XVI) wherein R" is H and/or Y is hydroxy can be acylated by conventional procedures, for example, by reaction with the appropriate acid anhydride in the presence of a tertiary base such as pyridine. The compounds in which R" is acyl and/or Y is acyloxy can be converted to the corresponding free alcohols by hydrolysis for example using mineral acid or p-toluene sulphonic acid under aqueous conditions. The compounds having the Formula XI wherein W is fluorine, Z is carbonyl and R, X', Y, and —C₁—C₂— have the significance hereinbefore defined can also be prepared from the corresponding compounds wherein X' and W taken together represent a 9(11)-double bond by procedures well known in the art for the introduction of a 9α-fluoro atom. For example, the Δ⁹⁽¹¹⁾-compound can be converted to the epoxide, for example, by reaction with N-bromoacetamide and perchloric acid or the like followed by treatment with potassium acetate in acetone to form the corresponding 9β,11β-oxido compound and the latter can be reacted with hydrogen fluoride under anhydrous or aqueous conditions to form the desired 9α-fluoro-11β-hydroxy compound. The 11β-hydroxy group can then be oxidized, for example, using chromic acid, sodium dichromate, and like oxidizing agents, to obtain the corresponding 11-keto compounds.

The compounds (XI), (XII), (XIII), (XIV), (XV) and (XVI) so obtained are novel compounds which exhibit activity as anti-inflammatory, progestational, central nervous system regulating, glucocorticoid, anti-hormonal, lipid-mobilizing, hypotensive, cardiotonic, cholesterol-lowering, and anti-fertility agents. In addition the compounds having the Formula XI above are useful intermediates in the preparation of the corresponding 6-dehydro compounds. The 6-dehydrogenation of the compounds of Formula XI can be accomplished, for example, by reacting the latter compounds with chloranil under reaction conditions conventional in the art for introducing the 6(7)-double bond, such as by heating the compound (XI) with chloranil in the presence of an inert organic solvent such as a lower alkanol, for example, isopropyl alcohol, butanol and the like. The 6-dehydro derivatives of compounds (XI) so obtained are valuable therapeutic agents exhibiting activity as anti-inflammatory, progestational, central nervous system regulating, glucocorticoid, anti-hormonal, lipid-mobilizing, hypotensive, cholesterol-lowering, and anti-fertility agents. These compounds can be prepared and administered in mammals, including humans and valuable domestic animals, and to birds, in a wide variety of oral or parenteral dosage forms using the procedures and formulations described above for the compounds (I), (II) and (III).

The compounds of the invention having the formulae I, II, and III can be prepared by reacting the appropriately substituted Δ¹⁶-pregnene with an alkyl vinyl ether R'O—CH=CH₂ wherein R' has the significance hereinbefore defined, using the reaction conditions hereinbefore described for the process of the invention. The reaction gives rise to a mixture of the 16α,6'α-, 16α,6'β-, 16β,6'α- and 16β,6'β-epimers of the desired product [(I), (II), or (III)] and said mixture can be separated by conventional procedures, for example, by fractional crystallization, chromatography, counter-current distribution, and the like, or any combination of these steps.

In carrying out the above reaction it is preferable to protect the 11β-hydroxy and/or 21-hydroxy group, if present, by conversion to the corresponding 11β-acylate and/or 21-acylate. The 21-hydroxy can be regenerated, after the process of the invention has been carried out, by hydrolyzing the 11β-acylate and/or 21-acylate [i.e., I, II or III; X=β acyloxy and/or Y=acyloxy] using basic conditions, for example, aqueous or aqueous alcoholic alkali metal hydroxide solution or alcoholic alkali metal alkoxide solution, if desired, at elevated temperatures, i.e., up to the boiling point of the reaction mixture. There is thus obtained the corresponding free 11β-hydroxy and/or 21-hydroxy compound [I, II, or III; X=β-OH and/or Y=OH].

The compounds of the invention having the Formulae I can also be prepared by subjecting the corresponding compounds of the Formula II wherein R" is hydrogen to oxidation, preferably using Oppenauer conditions according to procedures known in the art. For example, the oxidation can be carried out using aluminum tert.-butoxide and acetone or cyclohexanone in the presence of an anhydrous organic solvent such as toluene, benzene, petroleum ether, dioxane, or other organic solvents or mixtures thereof.

The compounds of the invention having the Formulae I, II, and III wherein Y is hydroxy and/or R" is hydrogen can be converted to the corresponding acylates using conventional procedures, for example, by treatment with the appropriate acid anhydride in the presence of a tertiary amine such as pyridine.

The starting Δ¹⁶-steroids employed in the above-described preparation of (I), (II) or (III) have the Formulae IA, IIA and IIIA, respectively:

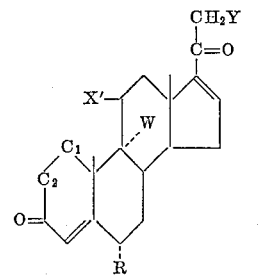

(IA)

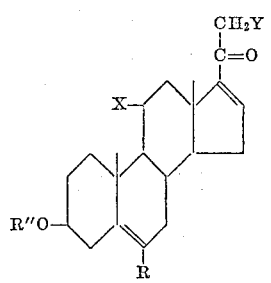

(IIA)

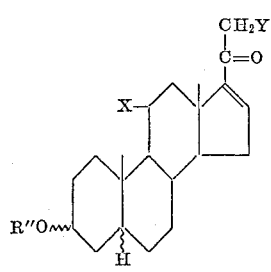

(IIIA)

In the above formulae R, R", W, X', X, Y, and —C₁—C₂— have the significance hereinbefore defined.

The starting compounds (IA), many of which are known, can be prepared as follows. The compounds (IA) wherein Y is hydrogen, X' is hydrogen, keto, or hydroxy, W is hydrogen, —C₁—C₂— is a saturated bond, and R is as hereinbefore defined, can be prepared from the known correspondingly substituted progesterones using the procedure described in J. Org. Chem. 20, 1709 (1955) for the preparation of 16-dehydro-11-ketoprogesterone and 16 - dehydro - 11α - hydroxy progesterone. The compound (IA) wherein X, Y, and R represent hydrogen (i.e., 16-dehydroprogesterone) is a known compound; see, for example, Steroids, Feiser and Feiser, p. 559, Reinhold (1959).

The starting compounds (IA), wherein Y is acyloxy, R is hydrogen, —C₁—C₂— is a saturated bond, W is hydrogen and X' is as hereinbefore defined, are known compounds which can be prepared from cortisone and hydrocortisone using the procedure described by Allen and Bernstein, J. Am. Chem. Soc. 77, 1028 (1955). The corresponding compounds wherein R is alkyl can be prepared using the same procedure but employing the corresponding 6α-alkylcortisone and 6α-alkylhydrocortisone as starting materials.

The starting compounds (IA) wherein W is fluorine, —C₁—C₂— is a single bond, and R, X' and Y have the significance hereinbefore defined can be prepared from the corresponding compounds in which X' is β-hydroxy and Y is acyloxy using the conventional procedure for the introduction of a 9α-fluoro compound, namely, by reacting the appropriate 11β-hydroxy compound with an N-haloamide or N-haloimide and anhydrous sulfur dioxide using the procedure described in U.S. Patent 3,005,834, treating the corresponding 9(11)-compound so obtained with N-bromoacetamide and perchloric acid or the like followed by treatment with potassium acetate in acetone to form the corresponding 9β,11β-oxido compound and reacting the latter compound with hydrogen fluoride under anhydrous or aqueous conditions to form the desired 9α-fluoro-11β-hydroxy compound. The 9α-fluoro-11β-hydroxy compounds can be oxidized, for example, using chromic acid, sodium dichromate, and like oxidizing agents, to obtain the corresponding 11-keto compounds.

The compounds (IA) wherein —C₁—C₂— is a double bond and W, X', Y and R are as hereinbefore defined can be prepared from the corresponding compounds in which —C₁—C₂— is a saturated bond by subjecting the latter compounds to 1-dehydrogenation. The 1-dehydrogenation can be effected microbiologically using a 1-dehydrogenating microorganism, for example, of the genus Septomyxa using procedures such as that described in U.S. Patent 2,897,218, or can be effected chemically, for example, by treatment with selenium dioxide using procedures such as that described by Meystre et al., Helv. Chim. Acta 39, 734 (1956), or that described in British patent specification No. 864,414.

The starting compounds (IIA) wherein Y=hydrogen, X=hydrogen, and R=alkyl are described in U.S. Patent 3,000,914. The starting compounds (IIA) wherein X, Y and R all represent hydrogen and R" is as hereinbefore defined (i.e., 16-dehydropregnenolone and 3-acylates thereof) are also known; see, for example, Butenandt et al., Berichte 71, 1487 (1938).

The starting compounds (IIA) wherein Y is hydrogen, X is keto or α-hydroxy, R is hydrogen, and R" is as hereinbefore defined are described by Rothman and Wall, J. Am. Chem. Soc. 81, 411 (1959). The corresponding compounds in which X is β-hydroxy can be prepared from the 11-keto compound by converting the latter to its 20-ethyleneketal using standard procedures, subjecting the 11-keto-20-ketal to reduction using lithium aluminum hydride and hydrolyzing the 11β-hydroxy-20-ketal so obtained, to yield the desired 11β-hydroxy compound.

The starting compounds (IIA) wherein Y is hydrogen, X is keto, R is methyl and R" is as hereinbefore defined can be prepared from 11-ketodiosgenin acetate (Rothman and Wall, supra) using the procedure described in U.S. Patent 3,000,914 (Example 1) for the conversion of diosgenin acetate to 3β-acetoxy-6-methyl-5,16-pregnadiene-20-one. The 11-keto compound so obtained can be converted to corresponding 11α-hydroxy and 11β-hydroxy compounds using conventional procedures. For example, the 11-keto compound is converted to the 20-ketal and the latter is reduced (a) using sodium in a lower alkanol according to the procedure described in U.S. Patent 2,751,379, followed by hydrolysis of the resulting 11α-hydroxy-20-ketal or (b) using lithium aluminum hydride to give the corresponding 11β-hydroxy-20-ketal which is then hydrolyzed to yield the desired 11β-hydroxy compounds.

The starting compounds (IIA) wherein Y is hydroxy or acyloxy, X is hydrogen, hydroxy (α or β), and keto and R and R" have the significance hereinbefore defined can be prepared from the corresponding compounds in which Y is hydrogen using the procedure described by Djerassi and Lenk, J. Am. Chem. Soc. 76, 1722 (1954), for the conversion of Δ⁵,¹⁶-pregnadien-3β-ol-20-one acetate to Δ⁵,¹⁶-pregnadiene-3β,21-diol-20-one diacetate, namely, by conversion of the former to the enol acetate, reaction of the enol acetate with N-iodosuccinimide to give the corresponding 21-iodo compound and acylative hydrolysis of the latter to give the desired compound. Where X is 11α-hydroxy and/or R" is hydrogen in the starting material it is necessary to protect the free hydroxy group or groups by acylation using standard procedures before carrying out the above reaction.

The compounds (IIA) wherein X is 9(11)-dehydro, R" is acyl, Y is hydrogen or acyloxy, and R has the significance hereinbefore defined, can be prepared by dehydration of the corresponding 11-hydroxy compounds (α or β) using an N-haloamide or N-haloimide and anhydrous sulfur dioxide using the procedure described in U.S. Patent 3,005,834.

All the starting materials having the Formula IIIA, many of which are known, can be prepared by conversion of the corresponding 17-hydroxypregnanolones to the 20-semicarbazones, heating the latter with an organic acid such as acetic acid to produce the corresponding $\Delta^{16}$-20-semicarbazones and removing the semicarbazone residue therefrom by conventional procedures, for example, by treatment with pyruvic acid to form the desired compounds (IIIA). The reaction conditions employed in the above preparation are advantageously those described in Canadian Patent 618,079.

The starting compounds (IIIA) wherein Y is hydroxy or acyloxy and R″, and X have the significance hereinbefore defined, can be prepared from the corresponding 17-hydroxy-pregnanolones using the procedure described in British Patent 866,730 for the preparation of 3β,21-diacetoxy-5α-pregn-16-en-11,20-dione. The latter compound can be converted to the corresponding 11α- and 11β-hydroxy compounds using conventional procedures, for example, by conversion to the 20-ketal followed by (a) reduction of the latter using sodium in a lower alkanol according to the procedure described in U.S. Patent 2,751,379, followed by hydrolysis of the resulting 11α-hydroxy 20-ketal or (b) reduction of the 20-ketal using lithium aluminum hydride to give the corresponding 11β-hydroxy 3-ketal which is then hydrolyzed to yield the desired compound. The corresponding 9(11)-dehydro compounds can be obtained by dehydration of the appropriate 11-hydroxy (α or β) compound using an N-haloimide or N-haloamide and anhydrous sulfur dioxide using the procedure described in U.S. Patent 3,005,834.

The dienophiles having the formula A—CH=CH—B and D—C≡CB′ wherein A, B, B′, and D are as hereinbefore defined, are for the most part known compounds or can be prepared from known starting materials using conventional methods. Thus the compounds nitroethylene, vinyl chloride, vinyl bromide, vinyl fluoride, vinyl mercaptan, acrolein and the higher homologues thereof (i.e., the compounds A—CH=CH—B wherein A is nitro, halo, mercapto, and aldehydo and B is hydrogen or lower-alkyl) are well known in the art.

Similarly, the lower-alkenyl ethers of lower aliphatic alcohols and phenols (the compound A—CH=CH—B; A is lower-alkoxy or acyloxy and B is hydrogen or lower-alkyl) are for the most part well known in the art and can be prepared by etherification of the appropriate aliphatic alcohol or phenol using conventional procedures. Alternatively, said compounds can be prepared by reaction of the appropriate alcohol or phenol with the appropriate alkyne. See, for example, Schildknecht et al., Ind. Eng. Chem. 39, 180 (1947).

The compounds A—CH=CH—B wherein A is lower-alkanoyloxy or formyloxy and B is hydrogen or alkyl, many of which are known, can be prepared by reaction of the appropriate aliphatic carboxylic acid with the appropriate alkyne.

The compounds A—CH=CH—B wherein A is lower-alkanoyl and B is hydrogen or lower-alkyl, are for the most part known and can be obtained by conventional procedures for the preparation of unsaturated aliphatic ketones; for example, by Friedel-Crafts condensation of the appropriate 1-alkene and aliphatic carboxylic acid chloride.

The compounds A—CH=CH—B wherein A is lower-alkylmercapto or arylmercapto and B is hydrogen or lower-alkyl can be prepared by alkenylation of the appropriate lower-alkyl mercaptan or thiophenol using conventional procedures. Alternatively said compounds can be prepared by reaction of the appropriate alkylmercaptan or thiophenol with the appropriate alkyne.

The dienophiles D—C≡CH wherein D is lower alkoxy can be prepared by conventional procedures, for example, from the appropriate dibromoacetals $CHBr_2CHD_2$ using the procedure described by Jacobs et al., J. Am. Chem. Soc. 64, 223 (1942).

The following preparations and examples are illustrative of the process and compounds of the invention but are not to be construed as limiting.

PREPARATION 1

*11β-hydroxy-4,16-pregnadiene-3,20-dione*

A mixture of 10 g. of 4,16-pregnadiene-3,11,20-trione (Magerlein et al., J. Org. Chem. 20, 1709, 1955), 0.6 g. of p-toluenesulfonic acid, 50 ml. of ethylene glycol and 1 liter of benzene is stirred and heated under reflux. The water formed in the reaction is collected in a water trap. When the elimination of water is complete, the reaction mixture is cooled, washed with aqueous sodium bicarbonate solution, and then with water, and dried over anhydrous sodium sulfate. The dried solution is filtered, the filtrate is evaporated to dryness and the residue is recrystallized. There is thus obtained the 3,20-bis-ethylene ketal of 4,16-pregnadiene-3,11,20-trione.

A slurry of 2.5 g. of the 3,20-bis-ethylene ketal so obtained in 40 ml. of benzene is added to a slurry of 0.36 g. of lithium aluminum hydride in 200 ml. of anhydrous ether at such a rate as to cause gentle refluxing. When the addition is complete, the reaction mixture is heated under reflux for 1 hr. and then cooled and the excess hydride decomposed by the successive addition of ethyl acetate and water. The organic layer is separated, washed with water, and dried over anhydrous sodium sulfate. The dried solution is filtered, the filtrate is evaporated to dryness, and the residue is recrystallized from ethyl acetate. There is thus obtained the 3,20-bis-ethylene ketal of 11β-hydroxy-4,16-pregnadiene-3,20-dione.

A mixture of 0.5 g. of the latter compound, 20 ml. of acetone and 5 ml. of 3 N hydrochloric acid is heated under reflux for 4 hr. and then diluted with water. The solid which separates is isolated by filtration and dried. There is thus obtained 11β-hydroxy-4,16-pregnadiene-3,20-dione.

PREPARATION 2

*6α-methylpregna-4,16-diene-21-ol-3,11,20-trione 21-acetate*

Using the procedure described by Allen and Bernstein, J. Am. Chem. Soc. 77, 1031 (1955), for the conversion of cortisone acetate 3,20-bisketal to pregna-4,16-diene-21-ol-3,11,20-trione 21-acetate, 6α-methylcortisone acetate 3,20-bisketal is converted to 6α-methylpregna-4,16-diene-21-ol-3,11,20-trione 21-acetate.

PREPARATION 3

*6α-methylpregna-4,16-diene-11β,21-diol-3,20-dione 21-acetate*

Using the procedure described in Example 1, but replacing 4,16-pregnadiene-3,11,20-trione by 6α-methylpregna-4,16-diene-21-ol-3,11,20-trione, there is obtained 6α-methylpregna-4,16-diene-11β,21-diol-3,20-dione. The latter compound is converted to the corresponding 21-acetate by treatment with acetic anhydride in the presence of pyridine for several hours at room temperature, pouring the reaction mixture so obtained into water, and isolating the solid which separates.

PREPARATION 4

*6α-methylpregna-4,9(11),16-triene-21-ol-3,20-dione 21-acetate*

Using the procedure described by Allen and Bernstein, supra, for the conversion of hydrocortisone acetate 3,20-bisketal to pregna-4,9(11),16-triene-21-ol-3,20-dione 21-acetate, 6α-methylhydrocortisone acetate 3,20-bisketal is converted to 6α-methylpregna-4,9(11),16-triene-21-ol-3,20-dione 21-acetate.

PREPARATION 5

*6α-methylpregna-1,4,16-triene-3,20-dione*

A mixture of 8 g. of 6α-methyl-16-dehydroprogesterone, 8 g. of mercury, 6.5 ml. of acetic acid, 5 g. of selenium dioxide, and 300 ml. of tertiary butyl alcohol is stirred and heated under reflux in an atmosphere of nitrogen for 4 hr. An additional 2 g. of selenium dioxide is added and the mixture is heated under reflux for a further 3 hr. before evaporating half of the solvent in a fast stream of nitrogen. The residual concentrate is filtered hot, and the filtrate is diluted with a mixture of equal parts of methylene chloride and ether. The resulting solution is washed successively with freshly prepared aqueous ammonium sulfide solution, dilute ammonium hydroxide solution, and water. The washed solution is dried over anhydrous sodium sulfate and filtered and the filtrate is evaporated to dryness. The residue is recrystallized from aqueous alcohol to obtain 6α-methylpregna-1,4-16-triene-3,20-dione in the form of a crystalline solid.

Using the above procedure, but replacing 6α-methyl-16-dehydroprogesterone by

11β-hydroxy-4,16-pregnadiene-3,20-dione,
6α-methylpregna-4,16-diene-21-ol-3,11,20-trione 21-acetate,
6-α-methylpregna-4,16-diene-11β,21-diol-3,20-dione 21-acetate,
6α-methylpregna-4,9(11),16-triene-21-ol-3,20-dione 21-acetate
pregna-4,16-diene-3,11,20-trione,
11α-hydroxypregna-4,16-diene-3,20-dione,
pregna-4,16-diene-11β,21-diol-3,20-dione 21-acetate,
pregna-4,16-diene-21-ol-3,11,20-trione 21-acetate, and
pregna-4,16-diene-21-ol-3,20-dione 21-acetate, there are obtained 11β-hydroxypregna-1,4,16-triene-3,20-dione,
6α-methylpregna-1,4,16-triene-21-ol-3,11,20-trione 21-acetate,
6α-methylpregna-1,4-16-triene-11β,21-diol-3,20-dione 21-acetate,
6α-methylpregna-1,4,9(11),16-tetraen-21-ol-,3,20-dione 21-acetate,
pregna-1,4,16-triene-3,11,20-trione,
11α-hydroxypregna-1,4,16-triene-3,20-dione,
pregna-1,4,16-triene-11β,21-diol-3,20-dione 21-acetate,
pregna-1,4,16-triene-21-ol-3,11,20-trione 21-acetate and
pregna-1,4,16-triene-21-ol-3,20-dione 21-acetate
respectively.

PREPARATION 6

*5α-pregn-16-ene-3β,11β,21-triol-20-one 3,21-diacetate*

Using the procedure described in Preparation 1, 5α-pregn-16-ene-3β,21-diol-11,20-dione 3,21-diacetate (British Patent 866,730) is converted to the corresponding 20-ethylene ketal, the ketal so obtained is reduced with lithium aluminum hydride, and the 20-ketal of the 11β-hydroxy compound so produced is hydrolyzed to yield 5α-pregn-16-ene-3β,11β,21-triol-20-one. The latter compound is then acetylated by treating with acetic anhydride in pyridine solution for several hours at room temperature, pouring the reaction mixture into water and isolating the solid so obtained, to produce 5α-pregn-16-ene-3β,11β,21-triol-20-one 3,21-diacetate.

PREPARATION 7

*5β-pregn-16-ene-3α,11β-diol-20-one acetate*

Using the procedure described in Example 6, but replacing 5α-pregn-16-ene-3β,21-diol-11,20-dione 3,21-diacetate by 5β-pregn-16-ene-3α-ol-11,20-dione acetate, there is obtained 5β-pregn-16-ene-3α,11β-diol-20-one acetate.

PREPARATION 8

*3β-acetoxy-11β-hydroxy-5,16-pregnadiene-20-one*

Using the procedure described in Preparation 1, but replacing 4,16-pregnadiene-3,11,20-trione by 3β-acetoxy-5,16-pregnadiene-11,20-dione (Rothman and Wall, supra), there is obtained 3β-hydroxy-11β-hydroxy-5,16-pregnadiene-20-one. The latter compound is dissolved in pyridine and allowed to stand for several hours in admixture with excess acetic anhydride. The reaction mixture is poured into water and the solid which separates is isolated by filtration and dried to yield 3β-acetoxy-11β-hydroxy-5,16-pregnadiene-20-one.

PREPARATION 9

*3β-acetoxy-6-methylpregna-5,16-diene-11,20-dione*

11-ketodiosgenin acetate (Rothman and Wall, supra) is reduced with lithium aluminum hydride using the procedure described in the second paragraph of Preparation 1, above, to obtain 11β-hydroxydiosgenin. A solution of the latter compound in chloroform is then treated at 0° C. with a slight excess of monoperphthalic acid in ether. The mixture is allowed to stand for several hours at approximately 25° C. before being filtered. The filtrate is washed with water until the washings are neutral and then evaporated almost to dryness. The residue is treated with methanol and the resulting solution is concentrated and allowed to crystallize. The crystalline material is isolated by filtration to give 5α,6α-epoxy-11β-hydroxydiosgenin.

A solution of 5α,6α-epoxy-11β-hydroxydiosgenin so obtained in benzene is cooled and treated slowly with stirring with an excess of a solution of methyl magnesium iodide in ether. The resulting mixture is heated under reflux for several hours and then cooled and decomposed by the cautious addition of water. The organic layer is separated, washed with water and dried. The dried solution is evaporated to dryness and the residue is recrystallized to obtain 5α-hydroxy-6β-methyl-11β-hydroxydiosgenin. The latter compound is dissolved in a mixture of acetic anhydride and pyridine and the mixture is allowed to stand for several hours before being poured into water. The solid which separates is isolated and dried to obtain 5α-hydroxy-6β-methyl-11β-hydroxydiosgenin 3-acetate.

The 5α-hydroxy-6β-methyl-11β-hydroxydiosgenin 3-acetate so obtained is added to a slurry of chromium trioxide in pyridine and the mixture is allowed to stand for several hours at about 25° C. The resulting mixture is poured into a mixture of ethyl acetate and benzene and then filtered. The filtrate is washed with water and evaporated to dryness and the residue is recrystallized to obtain 5α-hydroxy-6β-methyl-11-ketodiosgenin acetate. A solution of the latter compound in acetic anhydride is then maintained for several hours at approximately 195° C. and then diluted with 90 percent acetic acid solution. The resulting solution is cooled to 15° C. and treated with a solution of chromium trioxide in aqueous acetic acid. The mixture so obtained is allowed to stand for a short period and then evaporated under reduced pressure. The residue is heated under reflux for several hours with aqueous acetic acid and the reaction mixture is cooled, diluted with water and extracted with ethyl acetate. The ethyl acetate extract is evaporated to dryness and the residue is chromatographed on a column of magnesium silicate (Florisil). The column is eluted with Skellysolve B containing increasing proportions of acetone and those fractions which, on the basis of infrared spectrum analysis, are found to contain the desired material are combined and evaporated to obtain 3β-acetoxy-6-methylpregn-5,16-diene-11,20-dione.

PREPARATION 10

3β-acetoxy-6-methyl-11β-hydroxy-5,16-pregnadiene-20-one

Using the procedure described in Preparation 1, but replacing 4,16-pregnadiene-3,11,20-trione by 3β-acetoxy-6-methyl-5,16-pregnadiene-11,20-dione, there is obtained 3β-hydroxy-6-methyl-11β-hydroxy-5,16-pregnadiene-20-one. The latter compound is dissolved in pyridine and allowed to stand for several hours in admixture with excess acetic anhydride. The reaction mixture is poured into water and the solid which separates is isolated by filtration and dried to yield 3β-acetoxy-6-methyl-11β-hydroxy-5,16-pregnadiene-20-one.

PREPARATION 11

3β,21-diacetoxy-6-methyl-5,16-pregnadiene-11,20-dione

Using the procedure described by Djerassi and Lenk, supra, for the conversion of $\Delta^{5,16}$-pregnadiene-3β-ol-20-one acetate to $\Delta^{5,16}$-pregnadiene-3β,21-diol-20-one diacetate, 3β-acetoxy-6-methyl-5,16-pregnadiene-11,20-dione is converted to 3β,21-diacetoxy-6-methyl-5,16-pregnadiene-11,20-dione.

PREPARATION 12

9α-fluoro-4,16-pregnadiene-21-ol-3,11,20-trione 21-acetate

A solution of 9α-fluoro-4,16-pregnadiene-11β,21-diol-3,20-dione 21-acetate (U.S. Patent 2,966,504) in pyridine is added to an excess of a slurry of chromium trioxide in pyridine and the mixture is allowed to stand for several hours at approximately 25° C. To the reaction mixture is then added a mixture of ethyl acetate and benzene and the resulting product is filtered. The filtrate is washed with water and evaporated to dryness and the residue is recrystallized to obtain 9α-fluoro-4,16-pregnadiene-21-ol-3,11,20-trione 21-acetate in the form of a crystalline solid.

Using the same procedure, 9α-fluoro-1,4,16-pregnatriene-11β,21-diol 21-acetate is oxidized to 9α-fluoro-1,4,16-pregnatriene-21-ol-3,11,20-trione 21-acetate.

PREPARATION 13

9α-fluoro-4,16-pregnadiene-3,11,20-trione

A solution of 9α-fluoro-4,16-pregnadiene-21-ol-3,11,20-trione 21-acetate in a mixture of methanol and excess hydrochloric acid is heated under reflux for a short period before being diluted with water and concentrated under reduced pressure. The aqueous concentrate is cooled and the solid which separates is isolated by filtration, washed with water and dried. The 9α-fluoro-4,16-pregnadiene-21-ol-3,11,20-trione so obtained is dissolved in pyridine and the resulting solution is cooled and treated with an excess of methanesulfonyl chloride. The reaction mixture is stirred at 0° C. to 5° C. for several hours and then decomposed by the addition of ice water. The reaction mixture is then neutralized by the addition of hydrochloric acid. The solid which separates is isolated by filtration, washed with water and dried. The 9α-fluoro-4,16-pregnadiene-21-ol-3,11,20-trione 21-methanesulfonate so obtained is dissolved in acetone and treated with an equimolar amount of sodium iodide in acetone. The mixture so obtained is heated under reflux for a short period and then diluted with water. The solid which separated is isolated by filtration, washed with water, and dried. The 9α-fluoro-21-iodo-4,16-pregnadiene-3,11,20-trione so obtained is slurried with acetic acid and treated with a solution of sodium thiosulfate pentahydrate in water until the color of iodine disappeared. The resulting mixture is diluted with water and the solid which separates is isolated by filtration and recrystallized to obtain 9α-fluoro-4,16-pregnadiene-3,11,20-trione.

Using the same procedure, 9α-fluoro-1,4,16-pregnatriene-21-ol-3,11,20-trione 21-acetate is converted to 9α-fluoro-1,4,16-pregnatriene-3,11,20-trione.

EXAMPLE 1

$\Delta^5$-3β-acetoxy-2'-methyl-6'α-methoxy-5',6'-dihydroandrostano-[17,16α-c]-pyran, $\Delta^5$-3β-acetoxy-2'-methyl-6'β-methoxy-5',6'-dihydroandrostano-[17,16α-c]-pyran, $\Delta^5$-3β-acetoxy-2'-methyl-6'α-methoxy-5',6'-dihydroandrostano-[17,16β-c]-pyran and $\Delta^5$-3β-acetoxy-2'-methyl-6'β-methoxy-5',6'-dihydroandrostano-[17,16β-c]-pyran A mixture of 150 g. of 16-dehydropregnenolone acetate, 600 ml. of methyl vinyl ether, and 0.6 g. of hydroquinone was heated for 24 hr. at 200° C. The autoclave was charged with nitrogen at 10 p.s.i. before raising the temperature. At the end of the reaction time the reaction mixture was cooled and the excess methyl vinyl ether was removed by distillation. The residue was dissolved in 500 ml. of methylene chloride and the solution was chromatographed on a column of magnesium silicate (Florisil). The column was eluted with Skellysolve B (commercial hexanes) containing increasing proportions of acetone and those fractions of the eluate which were found by infrared and papergram analysis to contain the desired product were combined and evaporated to dryness to yield the following materials:

(a) 72 g. of material having a melting point of 186 to 192° C. after recrystallization from Skellysolve B and acetone. This material was recrystallized from methanol to give $\Delta^5$-3β-acetoxy-2'-methyl-6'β-methoxy-5',6'-dihydroandrostano-[17,16α-c]-pyran in the form of a crystalline solid having a melting point of 194 to 195° C. An analytical sample having a melting point of 205 to 207° C. was prepared by recrystallization from acetone.

*Analysis.*—Calcd. for $C_{26}H_{38}O_4$: C, 75.32; H, 9.24. Found: C, 75.23; H, 9.11.

The infrared spectrum of the compound (mineral oil mull) exhibited maxima at 1740, 1735, 1695, 1245, 1200, 1155, 1075, 1040 and 1020 reciprocal centimeters in agreement with the following structure:

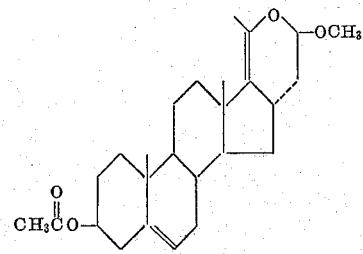

(b) A mixture of $\Delta^5$-3β-acetoxy-2'-methyl-6'α-methoxy-5',6'-dihydroandrostano-[17,16α-c]-pyran, $\Delta^5$-3β-acetoxy-2'-methyl-6'β-methoxy-5',6'-dihydroandrostano-[17,16β-c]-pyran, and $\Delta^5$-3β-acetoxy-2'-methyl-6'α-methoxy-5',6'-dihydroandrostano-[17,16β-c]-pyran. This mixture is separated into its component parts by further chromatography using the procedure described above, selection of the appropriateractions of the eluate by paperchromatographic and infrared analysis, followed by recrystallization of the solid material isolated from said fractions.

EXAMPLE 2

$\Delta^5$-3β-hydroxy-2'-methyl-6'β-methoxy-5',6'-dihydroandrostano-[17,16α-c]-pyran A mixture of a solution of 8.1 g. of $\Delta^5$-3β-acetoxy-2'-methyl-6'β-methoxy-5',6'-dihydroandrostano-[17,16α-c]-pyran in 250 ml. of tetrahydrofuran and 250 ml. of methanol with 40 ml. of 25 percent aqueous potassium hydroxide solution and 100 ml. of water was stirred under nitrogen for 18 hrs. at approximately 25° C. At the end of this time the solution was neutralized by the addition of acetic acid and the solvent was removed under reduced pressure until crystallization began. Water was added to the concentrate and the mixture was allowed to stand in the refrigerator. The solid which had separated was isolated by filtration, washed with water, dried in vacuo, and recrystallized from a mixture of acetone and Skellysolve B. There was thus obtained 5.4 g. of Δ⁵-3β-hydroxy-2′-methyl-6′β-methoxy-5′,6′-dihydroandrostano - [17,16α-c]-pyran in the form of a crystalline solid having a melting point of 192 to 204° C.

*Analysis.*—Calcd. for C₂₄H₃₆O₃: C, 77.37; H, 9.74. Found: C, 77.20; H, 9.53.

The infrared spectrum of the compound (mineral oil mull) exhibited maxima at 3520, 1695, 1245, 1195, 1160, 1085, 1065 and 1015 reciprocal centimeters in agreement with the following structure:

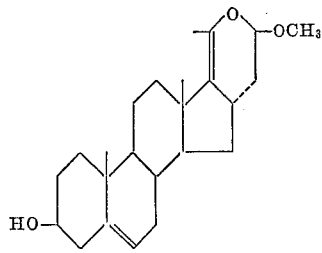

Similarly, Δ⁵-3β-hydroxy - 2′ - methyl-6′α-methoxy-5′,6′-dihydroandrostano-[17,16α-c]-pyran, Δ⁵-3β-hydroxy-2′-methyl - 6′α - methoxy-5′,6′-dihydroandrostano-[17,16β-c]-pyran, and Δ⁵-3β-hydroxy-2′-methyl-6′β-methoxy-5′,6′-dihydroandrostano-[17,16β-c]-pyran, are obtained by hydrolysis of the corresponding 3-acetates using the above procedure.

EXAMPLE 3

Δ⁴-3-keto-2′-methyl-6′β-methoxy-5′,6′-dihydroandrostano-[17,16α-c]-pyran

A solution of 15 g. of Δ⁵-3β-hydroxy-2′-methyl-6′β-methoxy-5′,6′-dihydroandrostano-[17,16α-c]-pyran in 1 liter of toluene was heated with stirring to boiling and water was removed azeotropically. To the dried solution was added 300 ml. of cyclohexanone and the mixture was heated under reflux for 30 minutes with removal of water azeotropically. To the dried solution was added a solution of 20 g. of aluminum isopropoxide in 150 ml. of toluene previously dried by azeotropic distillation. The resulting mixture was heated under reflux, with a water separator, for 20 hrs. The product was cooled to room temperature, washed with saturated aqueous Rochelle salt solution, then with water, and dried over anhydrous sodium sulfate. The aqueous layers from the washings were combined and extracted with benzene and the benzene extract was washed with water and then added to the main organic solution. The dried solution was filtered and the filtrate was evaporated under reduced pressure to remove the benzene and toluene. The residue was allowed to stand and the solid which had separated was isolated by filtration, washed with ether and dried to give 8.8 g. of material having a melting point of 208 to 216° C. The mother liquors were chromatographed on a column of magnesium silicate (Florisil). The column was eluted with Skellysolve B containing increasing proportions of acetone and those fractions which, on the basis of paperchromatogram analysis, were found to contain the desired product were combined and evaporated to dryness. There was thus obtained 2.84 g. of material having a melting point of 200 to 215° C. which was combined with the solid material obtained as described above. The mixture (11.64 g.) was recrystallized first from a mixture of Skellysolve B and acetone and then from acetone. There was thus obtained Δ⁴-3-keto - 2′ - methyl-6′β-methoxy-5′,6′-dihydroandrostano-[17,16α-c]-pyran in the form of a crystalline solid having a melting point of 213 to 218° C. The infrared spectrum of the compound (mineral oil mull) exhibited maxima at 1695, 1670, 1625, 1195, 1150, 1130, 1070, 1040, and 1015 reciprocal centimeters. The ultraviolet spectrum of the compound (ethanol solution) exhibited a maximum at 241 millimicrons; ε=16,800.

*Analysis.*—Calcd. for C₂₄H₃₄O₃: C, 77.80; H, 9.25. Found: C, 77.63; H, 9.42.

Using the above procedure, but replacing Δ⁵-3β-hydroxy-2′-methyl-6′β - methoxy-5′,6′-dihydroxyandrostano- [17,16α-c]-pyran by Δ⁵-3β-hydroxy-2′-methyl-6′α-methoxy-5′,6′-dihydroandrostano-[17,16α-c]-pyran, Δ⁵-3β-hydroxy - 2′ - methyl-6′α-methoxy-5′,6′-dihydroandrostano- [17,16β-c]-pyran, or Δ⁵-3β-hydroxy-2′-methyl-6′β-methoxy-5′,6′-dihydroandrostano-[17,16β-c]-pyran, there are obtained Δ⁴-3-keto-2′-methyl-6′α-methoxy-5′,6′ - dihydroandrostano-[17,16α-c]-pyran, Δ⁴ - 3 - keto-2′-methyl-6′α-methoxy-5′,6′ - dihydroandrostano-[17,16β-c]-pyran, and Δ⁴-3-keto - 2′ - methyl-6′β-methoxy-5′,6′ - dihydroandrostano-[17,16β-c]-pyran, respectively.

EXAMPLE 4

Δ⁴-3-keto-6α-methyl-2′-methyl-6′β-methoxy-5′,6′-dihydroandrostano-[17,16α-c]-pyran A mixture of 20 g. of 6α-methyl-16-dehydroprogesterone, 100 ml. of methyl vinyl ether and 0.1 g. of hydroquinone was heated for 24 hrs. at 200° C. in an autoclave. The autoclave was charged with nitrogen at 10 p.s.i. before raising the temperature. At the end of the period of heating the autoclave was cooled and the reaction mixture was distilled to remove excess methyl vinyl ether. The residue was dissolved in 50 ml. of methylene chloride and chromatographed on a column of magnesium silicate packed under Skellysolve B. The column was eluted using Skellysolve B containing increasing proportions of acetone and those fractions of the eluate which were found by infrared and papergram analysis to contain the desired product were combined and evaporated to dryness to yield the following materials:

(a) 5.3 g. of material which after recrystallization from methanol had a melting point of 197 to 201° C. This material was recrystallized from methanol and then from a mixture of Skellysolve B and acetone. There was thus obtained Δ⁴-3-keto 6α-methyl-2′-methyl-6′β-methoxy-5′,6′-dihydroandrostano-[17,16α-c]-pyran having a melting point of 203 to 209° C.

*Analysis.*—Calcd. for C₂₅H₃₆O₃: C, 78.08; H, 9.44. Found: C, 77.83; H, 9.66.

The ultraviolet spectrum of the compound (ethanol solution) exhibited a maximum at 241 millimicrons (ε=16,050). The infrared spectrum of the compound (mineral oil mull) exhibited maxima at 1695, 1675, 1610, 1185, 1160, 1075, 1055 and 1020 reciprocal centimeters in agreement with the following structural formula:

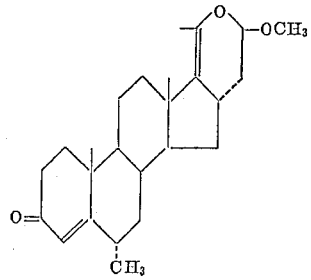

(b) A mixture of Δ⁴-3-keto-6α-methyl-2′-methyl-6′α-methoxy - 5′,6′ - dihydroandrostano - [17,16α-c] - pyran, Δ⁴ - 3 - keto - 6α - methyl - 2′ - methyl - 6′α - methoxy-5′,6′ - dihydroandrostano - [17,16β-c] - pyran, and Δ⁴-3 - keto - 6α - methyl - 2′ - methyl - 6′β - methoxy - 5′,6′-dihydroandrostano-[17,16β - c] - pyran. This mixture is separated into its component parts by further chromatography using the procedure described above, selection of the appropriate fractions of the eluate by paper chromatographic and infrared analysis, followed by recrystallization of the solid materials isolated from said fractions.

EXAMPLE 5

Δ¹,⁴,⁹⁽¹¹⁾ - 3 - keto - 6α - methyl - 2' - methyl-6'β-methoxy-5',6'-dihydroandrostano-[17,16α-c]-pyran A mixture of 25 g. of 6α-methylpregna-1,4,9(11),16-tetraene-3,20-dione, 100 ml. of methyl vinyl ether, and 0.1 g. of hydroquinone was heated for 24 hr. at 200° C. in an autoclave. The autoclave was charged with nitrogen at 10 p.s.i. before raising the temperature. After the heating period was completed the autoclave was cooled and the reaction mixture was distilled to remove excess methyl vinyl ether. The residue was dissolved in 50 ml. of methylene chloride and chromatographed on a column of magnesium silicate (Florisil) packed in Skellysolve B. The column was eluted with Skellysolve B containing increasing proportions of acetone and those fractions of the eluate which were found by infrared and papergram analysis to contain the desired product were combined and evaporated to dryness to yield the following materials:

(a) Material which was recrystallized from methanol to give a first crop of 3.65 g. of material having a melting point of 140 to 168° C. and a second crop having a melting point of 131 to 134° C. The first crop was recrystallized from methanol to give Δ¹,⁴,⁹⁽¹¹⁾-3-keto-6α-methyl - 2' - methyl - 6'β - methoxy - 5',6' - dihydroandrostano-[17,16α-c]-pyran having a melting point of 171 to 175° C.

Analysis.—Calcd. for $C_{25}H_{32}O_3$: C, 78.91; H, 8.48. Found: C, 78.93; H, 8.52.

The ultraviolet spectrum of the compound (ethanol solution) exhibited a maximum at 238 millimicrons (ε=16,350). The infrared spectrum of the compound (mineral oil mull) exhibited maxima at 3040, 3020, 1695, 1668, 1663, 1628, 1607, 1080, 1077, 1063, 1050, 1030 and 1018 reciprocal centimeters in agreement with the following structural formula:

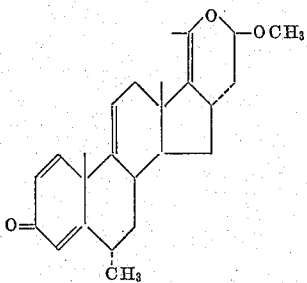

(b) A mixture of Δ¹,⁴,⁹⁽¹¹⁾-3-keto-6α-methyl-2'-methyl-6'β - methoxy - 5',6' - dihydroandrostano - [17,16β-c]-pyran, Δ¹,⁴,⁹⁽¹¹⁾ - 3 - keto - 6α - methyl - 2' - methyl - 6'α-methoxy - 5',6' - dihydroandrostano - [17,16β-c] - pyran, and Δ¹,⁴,⁹⁽¹¹⁾ - 3 - keto - 6α - methyl - 2' - methyl - 6'α-methoxy - 5',6' - dihydroandrostano - [17,16α-c] - pyran. This mixture is separated into its component parts by further chromatography using the procedure described above, selection of the appropriate fractions of the eluate by paper chromatographic and infrared anlaysis, followed by recrystallization of the solid materials isolated from said fractions.

EXAMPLE 6

Δ⁵-3β-acetoxy-2'-acetoxymethyl-6'β-methoxy-5',6'-dihydroandrostano-[17,16α-c]-pyran A mixture of 20 g. of pregna-5,16-dien-20-one-3,21-diol 3,21-diacetate (Djerassi et al., J. Am. Chem. Soc. 76, 1722, 1954), 80 ml. of methyl vinyl ether and 0.1 g. of hydroquinone was heated in an autoclave at 200° C. for 24 hr. The autoclave was charged with nitrogen at 10 p.s.i. before raising the temperature. At the end of the reaction period the autoclave was cooled and the reaction product was distilled to remove excess methyl vinyl ether. The residue was dissolved in 30 ml. of methylene chloride and chromatographed on a column of magnesium silicate (Florisil). The column was eluted with Skellysolve B containing increasing proportions of acetone, and those fractions of the eluate which were found by infrared and papergram analysis to contain the desired product were combined and evaporated to dryness to yield the following materials:

(a) 6.73 g. of material having a melting point of 142 to 146° C. which was recrystallized twice from methanol. There was thus obtained Δ⁵-3β-acetoxy-2'-acetoxymethyl-6'β - methoxy - 5',6' - dihydroandrostano - [17,16α-c]-pyran in the form of a crystalline solid having a melting point of 150 to 152° C.

Analysis.—Calcd. for $C_{28}H_{40}O_6$: C, 71.16; H, 8.53. Found: C, 71.23; H, 8.52.

The infrared spectrum of the compound (mineral oil mull) exhibited maxima at 1725, 1245, 1205, 1120, 1070, 1055, 1035, 1020, and 1010 reciprocal centimeters in agreement with the following structural formula:

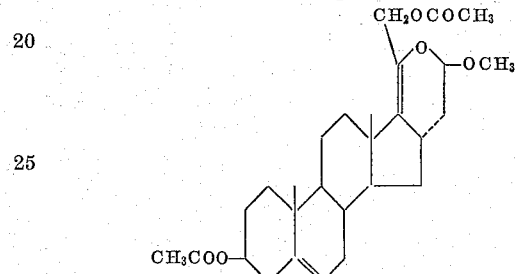

(b) A mixture of Δ⁵-3β-acetoxy-2'-acetoxymethyl-6'β-methoxy - 5',6' - dihydroandrostano - [17,16β-c] - pyran, Δ⁵ - 3 - acetoxy - 2' - acetoxymethyl - 6'α - methoxy - 5',6'-dihydroandrostano-[17,16β-c]-pyran, and Δ⁵-3β-acetoxy-2' - acetoxymethyl - 6'α - methoxy - 5',6' - dihydroandrostano-[17,16α-c]-pyran. This mixture is separated into its component parts by further chromatography using the procedure described above, selection of the appropriate fractions of the eluate by paper chromatographic and infrared analysis, followed by recrystallization of the solid materials isolated from said fractions.

EXAMPLE 7

Δ⁴-3,11-diketo-2'-methyl-6'β-methoxy-5',6'-dihydroandrostano-[17,16α-c]-pyran

Using the procedure described in Example 4, but replacing 6α-methyl-16-dehydroprogesterone by 4,16-pregnadien-3,11,20-trione (Magerlein et al., J. Org. Chem. 70, 1709, 1955), there are obtained Δ⁴-3,11-diketo-2'-methyl-6'β-methoxy-5'6'-dihydroandrostano-[17,16α - c] - pyran, Δ⁴-3,11-diketo-2'-methyl - 6'β - methoxy - 5'6' - dihydroandrostano-[17,16β-c]-pyran, Δ⁴ - 3,11-diketo-2'-methyl-6'α-methoxy-5',6'-dihydroandrostano-[17,16β - c] - pyran, and Δ⁴ - 3,11-diketo-2'-methyl-6'α-methoxy-5',6'-dihydroandrostano-[17,16α-c]-pyran.

EXAMPLE 8

Δ⁴-3-keto-11α-hydroxy-2'-methyl-6'β-methoxy-5'6'-dihydroandrostano-[17,16α-c]-pyran Using the procedure described in Example 4, but replacing 6α-methyl-16-dehydroprogesterone by 11α-hydroxy-4,16-pregnadiene-3,20-dione (Magerlein et al., supra), there are obtained Δ⁴-3-keto-11α-hydroxy-2'-methyl - 6'β-methoxy-5',6'-dihydroandrostano-[17,16α-c]-pyran, Δ⁴ - 3 - keto-11α-hydroxy-2'-methyl-6'β-methoxy-5',6'-dihydroandrostano-[17,16β-c]-pyran, Δ⁴-3-keto-11α-hydroxy-2'-methyl-6'α-methoxy-5'6' - dihydroandrostano-[17,16α-c]-pyran, and Δ⁴-3-keto-11α-hydroxy-2'-methyl-6'α-methoxy-5',6'-dihydroandrostano-[17,16β-c]-pyran.

EXAMPLE 9

Δ⁴-3-keto-11β-hydroxy-2'-methyl-6'β-methoxy-5',6'-dihydroandrostano-[17,16α-c]-pyran Using the procedure described in Example 4, but replacing 6α-methyl-16-dehydroprogesterone by 11β-hydroxy-4,16-pregnadiene-3,20-dione (Magerlein et al., supra), there are obtained $\Delta^4$-3-keto-11$\beta$-hydroxy-2'-methyl-6'$\beta$-methoxy-5'6'-dihydroandrostano-[17,16$\alpha$ - c]-pyran, $\Delta^4$ - 3 - keto - 11$\beta$-hydroxy-2'-methyl-6'$\beta$-methoxy-5',6'-dihydroandrostano-[17,16$\beta$-c]-pyran, $\Delta^4$-3-keto-11$\beta$-hydroxy-2'-methyl-6'$\alpha$-methoxy-5',6' - dihydroandrostano-[17,16$\alpha$ - c] - pyran, and $\Delta^4$-3-keto-11$\beta$-hydroxy-2'-methyl-6'$\alpha$-methoxy-5',6'-dihydroandrostano-[17,16$\beta$-c]-pyran.

EXAMPLE 10

$\Delta^4$-3-keto-11$\beta$-hydroxy-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydrogesterone by 4,16 - pregnadien 11$\beta$,21-diol-3,20-dione 21-acetate (Allen and Bernstein, supra), there are obtained $\Delta^4$-3-keto-11$\beta$-hydroxy-2'-acetoxymethyl - 6'$\beta$ - methoxy - 5'6' - dihydroandrostano-[17,16$\alpha$-c] - pyran, $\Delta^4$ - 3 - keto-11$\beta$-hydroxy-2'-acetoxymethyl-6'$\beta$-methoxy-5',6'-dihydroandrostano - [17,16$\beta$-c]-pyran, $\Delta^4$ - 3 - keto - 11$\beta$-hydroxy-2'-acetoxymethyl-6'$\alpha$-methoxy - 5',6'-dihydroandrostano-[17,16$\alpha$-c]-pyran, and $\Delta^4$ - 3 - keto - 11$\beta$-hydroxy-2'-acetoxymethyl-6'$\alpha$-methoxy-5',6'-dihydroandrostano-[17,16$\beta$-c]-pyran.

EXAMPLE 11

$\Delta^4$-3,11-diketo-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 4,16-pregnadiene-21-ol-3,11,20-trione 21-acetate (Allen and Bernstein, supra), there are obtained $\Delta^4$-3,11-diketo-2'-acetoxymethyl-6'$\beta$-methoxy-5',6'-dihydroandrostano-[17,16$\alpha$ - c]-pyran, $\Delta^4$-3,11-diketo-2'-acetoxymethyl-6'$\beta$-methoxy-5',6'-dihydroandrostano - [17,16$\beta$-c]-pyran, $\Delta^4$-3,11-diketo-2'-acetoxymethyl - 6'$\alpha$ - methoxy-5',6'-dihydroandrostano-[17,16$\alpha$-c]-pyran, and $\Delta^4$-3,11-diketo-2'-acetoxymethyl-6'$\alpha$-methoxy - 5',6'-dihydroandrostano-[17,16$\beta$-c]-pyran.

EXAMPLE 12

$\Delta^4$-3-keto-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 4,16-pregnadiene-21-ol-3,20-dione 21-acetate (Allen and Bernstein, supra), there are obtained $\Delta^4$-3-keto-2'-acetoxymethyl-6'$\beta$-methoxy-5',6'-dihydroandrostano-[17,16$\alpha$-c]-pyran, $\Delta^4$-3-keto-2'-acetoxymethyl-6'$\beta$-methoxy - 5'6' - dihydroandrostano - [17,16$\beta$-c]-pyran, $\Delta^4$-3-keto-2'-acetoxymethyl-6'$\alpha$-methoxy-5',6',-dihydroandrostano-[17,16$\alpha$-c]-pyran, and $\Delta^4$-3-keto-2'-acetoxymethyl-6'$\alpha$-methoxy - 5',6' - dihydroandrostano-[17,16$\beta$-c]-pyran.

EXAMPLE 13

$\Delta^4$-3,11-diketo-6$\alpha$-methyl-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 6$\alpha$-methyl-4,16-pregnadiene-21-ol-3,11,20-trione 21-acetate, there are obtained $\Delta^4$ - 3,11 - diketo-6$\alpha$-methyl-2'-acetoxymethyl-6'$\beta$-methoxy-5',6'-dihydroandrostano-[17,16$\alpha$ - c] - pyran, $\Delta^4$-3,11-diketo-6$\alpha$-methyl-2'-acetoxymethyl - 6'$\beta$ - methoxy-5',6'-dihydroandrostano-[17,16$\beta$-c]-pyran, $\Delta^4$-3,11-diketo-6$\alpha$-methyl-2'-acetoxymethyl-6'$\alpha$-methoxy- 5',6' - dihydroandrostano - [17,16$\alpha$ - c] - pyran, and $\Delta^4$-3,11-diketo-6$\alpha$-methyl-2'-acetoxymethyl-6'$\alpha$-methoxy - 5',6' - dihydroandrostano-[17,16$\beta$-c]-pyran.

EXAMPLE 14

$\Delta^4$-3-keto-11$\beta$-hydroxy-6$\alpha$-methyl-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 6$\alpha$-methyl-4,16-pregnadiene-11$\beta$,21-diol-3,20-dione 21-acetate, there are obtained $\Delta^4$-3-keto-11$\beta$-hydroxy-6$\alpha$-methyl-2'-acetoxymethyl-6'$\beta$-methoxy-5',6'-dihydroandrostano-[17,16$\alpha$ - c]-pyran, $\Delta^4$-3-keto-11$\beta$-hydroxy-6$\alpha$-methyl-2'-acetoxymethyl-6'$\beta$-methoxy-5',6'-dihydroandrostano-[17,16$\beta$-c]-pyran, $\Delta^4$-3-keto-11$\beta$-hydroxy-6$\alpha$-methyl-2'-acetoxymethyl - 6'$\alpha$-methoxy-5',6'-dihydroandrostano-[17,16$\beta$ - c] - pyran, and $\Delta^4$ - 3 - keto-11$\beta$-hydroxy-6$\alpha$-methyl-2'-acetoxymethyl-6'$\alpha$-methoxy-5',6'-dihydroandrostano-[17,16$\alpha$-c]-pyran.

EXAMPLE 15

$\Delta^{4,9(11)}$-3-keto-6$\alpha$-methyl-2'-acetoxymethyl-6'$\beta$-methoxy-5',6'-dihydroandrostano-[17,16$\beta$-c]-pyran Using the procedure described in Example 4, but replacing 6$\alpha$-methyl-16-dehydroprogesterone by 6$\alpha$-methyl-4,9(11),16 - pregnatriene - 21-ol-3,20-dione 21 - acetate, there are obtained $\Delta^{4,9(11)}$-3-keto-6$\alpha$-methyl-2'-acetoxymethyl-6'$\beta$-methoxy-5',6'-dihydroandrostano - [17,16$\beta$-c]-pyran, $\Delta^{4,9(11)}$-3-keto-6$\alpha$-methyl - 2' - acetoxymethyl - 6'$\beta$-methoxy - 5',6' - dihydroandrostano - [17,16$\alpha$-c] - pyran, $\Delta^{4,9(11)}$-3-keto-6$\alpha$-methyl-2'-acetoxymethyl - 6'$\alpha$-methoxy-5',6'-dihydroandrostano-[17,16$\alpha$-c]-pyran, and $\Delta^{4,9(11)}$-3-keto-6$\alpha$-methyl-2'-acetoxymethyl-6'$\alpha$ - methoxy-5',6'-dihydroandrostano-[17,16$\beta$-c]-pyran.

EXAMPLE 16

$\Delta^{1,4}$-3-keto-6$\alpha$,2'-dimethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 6$\alpha$-methyl-1,4,16-pregnatriene-3,20-dione, there are obtained $\Delta^{1,4}$-3-keto-6$\alpha$,2'-dimethyl-6'$\beta$-methoxy-5',6'-dihydroandrostano-[17,16$\alpha$-c]-pyran, $\Delta^{1,4}$-3-keto-6$\alpha$,2'-dimethyl-6'$\beta$-methoxy-5',6' - dihydroandrostano - [17,16$\beta$-c]-pyran, $\Delta^{1,4}$-3-keto-6$\alpha$,2' - dimethyl - 6'$\alpha$-methoxy - 5',6' - dihydroandrostano-[17,16$\alpha$-c]-pyran, and $\Delta^{1,4}$-3-keto-6$\alpha$,2'-dimethyl - 6'$\alpha$-methoxy-5',6'-dihydroandrostano-[17,16$\beta$-c]-pyran.

EXAMPLE 17

$\Delta^{1,4}$-3-keto-11$\beta$-hydroxy-2'-methyl-6'$\beta$-methoxy-5',6'-dihydroandrostano-[17,16$\alpha$-c]-pyran Using the procedure described in Example 4, but replacing 6$\alpha$-methyl - 16 - dehydroprogesterone by 11$\beta$-hydroxy-1,4,16-pregnatriene-3,20-dione, there are obtained $\Delta^{1,4}$-3-keto-11$\beta$-hydroxy-2'-methyl - 6'$\beta$-methoxy-5',6'-dihydroandrostano-[17,16$\alpha$-c]-pyran, $\Delta^{1,4}$ - 3 - keto-11$\beta$-hydroxy - 2' - methyl-6'$\beta$-methoxy-5',6'-dihydroandrostano-[17,16$\beta$-c]-pyran, $\Delta^{1,4}$-3-keto-11$\beta$-hydroxy-2'-methyl-6'$\alpha$-methoxy-5',6'-dihydroandrostano-[17,16$\alpha$ - c]-pyran, and $\Delta^{1,4}$-3-keto-11$\beta$-hydroxy-2'-methyl-6'$\alpha$-methoxy-5',6'-dihydroandrostano-[17,16$\beta$-c]-pyran.

EXAMPLE 18

$\Delta^{1,4}$-3,11-diketo-6$\alpha$-methyl-2'-acetoxymethyl-6'$\beta$-methoxy-5',6'-dihydroandrostano-[17,16$\alpha$-c]-pyran Using the procedure described in Example 4, but replacing 6$\alpha$-methyl-16-dehydroprogesterone by 6$\alpha$-methyl-1,4,16-pregnatriene-21-ol-3,11,20-trione 21-acetate, there are obtained $\Delta^{1,4}$-3,11-diketo-6$\alpha$-methyl-2'-acetoxymethyl-6'$\beta$-methoxy-5',6'-dihydroandrostano - [17,16$\alpha$-c]-pyran, $\Delta^{1,4}$-3,11 - diketo - 6$\alpha$-methyl - 2'-acetoxymethyl - 6'$\beta$-methoxy - 5',6'-dihydroandrostano - [17,16$\beta$-c]-pyran, $\Delta^{1,4}$-3,11-diketo - 6$\alpha$-methyl - 2'-acetoxymethyl - 6'$\alpha$-methoxy-5',6'-dihydroandrostano-[17,16$\alpha$-c]-pyran, and $\Delta^{1,4}$-3,11-diketo - 6$\alpha$-methyl-2'-acetoxymethyl - 6'$\alpha$-methoxy-5',6'-dihydroandrostano-[17,16$\beta$-c]-pyran.

EXAMPLE 19

$\Delta^{1,4}$-3-keto-11$\beta$-hydroxy-6$\alpha$-methyl-2'-acetoxymethyl-6'$\beta$-methoxy-5',6'-dihydrosandrostano-[17,16$\alpha$-c]-pyran Using the procedure described in Example 4, but replacing 6$\alpha$-methyl-16-dehydroprogesterone by 6$\alpha$-methyl-1,4,16-pregnatriene - 11$\beta$,21-diol - 3,20-dione 21-acetate, there are obtained $\Delta^{1,4}$-3-keto-11$\beta$-hydroxy-6$\alpha$-methyl-2'-acetoxymethyl - 6'$\beta$-methoxy - 5',6' - dihydroandrostano-[17,16$\alpha$-c]-pyran, $\Delta^{1,4}$-3-keto-11$\beta$-hydroxy-6$\alpha$-methyl-2'- acetoxymethyl - 6'β-methoxy - 5',6' - dihydroandrostano-[17,16β-c]-pyran, Δ$^{1,4}$ - 3 - keto-11β-hydroxy-6α-methyl-2'-acetoxymethyl-6'α-methoxy-5',6'-dihydroandrostano-[17,16α-c]-pyran, and Δ$^{1,4}$-3-keto-11β-hydroxy-6α-methyl-2'-acetoxymethyl - 6'α-methoxy - 5',6'-dihydroandrostano-[17,16β-c]-pyran.

EXAMPLE 20

Δ$^{1,4,9(11)}$-3-keto-6α-methyl-2'-acetoxymethyl-6'β-methoxy-5',6'-dihydroandrostano-[17,16α-c]-pyran Using the procedure described in Example 4, but replacing 6α-methyl-16-dehydroprogesterone by 6α-methyl-1,4,9(11),16-pregnatetraene - 21-ol-3,20-dione 21-acetate, there are obtained Δ$^{1,4,9(11)}$-3-keto-6α-methyl-2'-acetoxymethyl-6'β-methoxy-5',6'-dihydroandrostano - [17,16α-c]-pyran, Δ$^{1,4,9(11)}$-3-keto-6α-methyl - 2' - acetoxymethyl-6'β-methoxy - 5',6' - dihydroandrostano - [17,16β-c] - pyran, Δ$^{1,4,9(11)}$-3-keto - 6α-methyl - 2'-acetoxymethyl - 6'α-methoxy - 5',6' - dihydroandrostano-[17,16α-c]-pyran, and Δ$^{1,4,9(11)}$-3-keto-6α-methyl - 2' - acetoxymethyl - 6'α - methoxy-5',6'-dihydroandrostano-[17,16β-c]-pyran.

EXAMPLE 21

Δ$^{1,4}$-3,11-diketo-2'-methyl-6'β-methoxy-5',6'-dihydroandrostano-[17,16α-c]-pyran Using the procedure described in Example 4, but replacing 6α-methyl-16-dehydroprogesterone by 1,4,16-pregnatriene-3,11,20-trione, there are obtained Δ$^{1,4}$-3,11-diketo-2' - methyl - 6'β-methoxy - 5',6' - dihydroandrostano-[17,16α-c]-pyran, Δ$^{1,4}$-3-11-diketo-2'-methyl-6'β-methoxy-5',6'-dihydroandrostano-[17,16β-c]-pyran, Δ$^{1,4}$-3,11-diketo-2' - methyl - 6'α-methoxy - 5',6' - dihydroandrostano-[17,16α-c] - pyran, and Δ$^{1,4}$-3,11 - diketo - 2'-methyl-6'α-methoxy-5',6'-dihydroandrostano-[17,16β-c]-pyran.

EXAMPLE 22

Δ$^{1,4}$-3-keto-11α-hydroxy-2'-methyl-6'β-methoxy-5',6'-dihydroandrostano-[17,16α-c]-pyran Using the procedure described in Example 4, but replacing 6α-methyl-16-dehydroprogesterone by 11α-hydroxy-1,4,16-pregnatriene-3,20-dione, there are obtained Δ$^{1,4}$-3-keto - 11α-hydroxy - 2'-methyl - 6'β-methoxy-5',6'-dihydroandrostano - [17,16α-c]-pyran, Δ$^{1,4}$-3-keto-11α-hydroxy - 2'-methyl - 6'β-methoxy - 5',6'-dihydroandrostano-[17,16β-c]-pyran, Δ$^{1,4}$-3-keto-11α-hydroxy-2'-methyl-6'α-methoxy - 5',6'-dihydroandrostano-[17,16α-c]-pyran, and Δ$^{1,4}$-3-keto-11α-hydroxy-2'-methyl-6'α-methoxy-5',6-dihyandrostano-[17,16-c]-pyran.

EXAMPLE 23

Δ$^{1,4}$-3-keto-11β-hydroxy-2'-acetoxymethyl-6'β-methoxy-5',6'-dihydroandrostano-[17,16α-c]-pyran Using the procedure described in Example 4, but replacing 6α-methyl-16-dehydroprogesterone by 1, 4, 16-pregnatriene-11β,21-diol-3,20-dione 21-acetate, there are obtained Δ$^{1,4}$ - 3-keto-11β-hydroxy-2'-acetoxymethyl-6'β-methoxy - 5',6' - dihydroandrostano - [17,16α - c] - pyran, Δ$^{1,4}$-3-keto - 11β-hydroxy-2'-acetoxymethyl - 6'β-methoxy-5',6'-dihydronandrostano-[17,16β-c] - pyran, Δ$^{1,4}$-3-keto-11β - hydroxy - 2' - acetoxymethyl - 6'α - methoxy - 5',6'-dihydroandrostano-[17,16β-c]-pyran, and Δ$^{1,4}$ - 3 - keto-11β - hydroxy - 2' - acetoxymethyl - 6'α - methoxy - 5',6'-dihydronandrostano-[17,16α-c]-pyran.

EXAMPLE 24

Δ$^{1,4}$-3,11-diketo-2'-acetoxymethyl-6'β-methoxy-5',6'-dihydroandrostano-[17,16α-c]-pyran Using the procedure described in Example 4, but replacing 6α-methyl-16-dehydroprogesterone by 1, 4, 16-pregnatriene-21-ol-3,11,20-trione 21-acetate, there are obtained Δ$^{1,4}$ - 3,11 - diketo-2'-acetoxymethyl-6'β-methoxy-5',6'-dihydroandrostano - [17,16α - c] - pyran, Δ$^{1,4}$ - 3,11-diketo-2'-acetoxymethyl - 6'β - methoxy - 5',6' - dihydroandrostano-[17,16β-c]-pyran, Δ$^{1,4}$-3,11-diketo-2'- acetoxymethyl-6'α-methoxy-5',6'-dihydroandrostano - [17,16β-c]-pyran, and Δ$^{1,4}$-3,11-diketo-2'-acetoxymethyl-6'α-methoxy-5',6'-dihydroandrostano-[17,16α-c]-pyran.

EXAMPLE 25

Δ$^{1,4}$-3-keto-2'-acetoxymethyl-6'β-methoxy-5',6'-dihydroandrostano-[17,16α-c]-pyran Using the procedure described in Example 4, but replacing 6α - methyl - 16 - dehydroprogesterone by 1,4,16-pregnadiene-21-ol-3,20-dione 21-acetate, there are obtained Δ$^{1,4}$ - 3-keto - 2'-acetoxymethyl-6'β-methoxy-5',6'-dihydroandrostano - [17,16α - c] - pyran, Δ$^{1,4}$-3-keto-2'-acetoxymethyl - 6'β - methoxy - 5',6'-dihydroandrostano-[17,16β - c] - pyran, Δ$^{1,4}$ - 3 - keto-2'-acetoxymethyl-6'α-methoxy-5',6'-dihydroandrostano-[17,16β-c] - pyran, and Δ$^{1,4}$-3-keto-2'-acetoxymethyl-6'α-methoxy-5',6' - dihydroandrostano-[17,16α-c]-pyran.

EXAMPLE 26

Δ$^5$-3β-acetoxy-2',6'-dimethyl-6'β-methoxy-5',6'-dihydroandrostano-[17,16α-c]-pyran Using the procedure described in Example 1, but replacing 16-dehydropregnenolone acetate by 3β-acetoxy-6-methyl-5,16-pregnadien-20-one (U.S. Patent 3,000,914), there are obtained Δ$^5$ - 3β - acetoxy - 2',6'-dimethyl-6'β-methoxy - 5',6' - dihydroandrostano - [17,16α-c]-pyran, Δ$^5$-3β-acetoxy-2',6'-dimethyl-6'β-methoxy-5',6' - dihydroandrostano-[17,16β-c]-pyran, Δ$^5$ - 3β - acetoxy - 2',6-dimethyl - 6'α-methoxy-5',6'-dihydroandrostano-[17,16β-c]-pyran, and Δ$^5$-3β-acetoxy-2',6'-dimethyl-6'α-methoxy-5' 6'-dihydroandrostano-[17,16α-c]-pyran.

EXAMPLE 27

3β-acteoxy-11-keto-2'-acetoxymethyl-6'β-methoxy-5',6'-dihydro-5α-androstano-[17,16α-c]-pyran Using the procedure described in Example 1, but replacing 16-dehydropregnenolone acetate by 5α-pregn-16-ene-3β,21-diol-11,20-dione 3,21-diacetate (British Patent 866,730), there are obtained 3β-acetoxy-11-keto-2'-acetoxymethyl-6'β-methoxy-5',6'- dihydro - 5α - androstano-[17,16α-c]-pyran, 3β - acetoxy-11-keto-2'-acetoxymethyl-6'β-methoxy-5',6'-dihydro-5α-androstano - [17,16β - c]-pyran, 3β-acetoxy-11-keto-2'-acetoxymethyl-6'α-methoxy-5',6'-dihydro-5α-androstano-[17,16α-c] - pyran, and 3β-acetoxy-11-keto-2'-acetoxymethyl - 6'α - methoxy - 5',6'-dihydro-5α-androstano-[17,16β-c]-pyran.

EXAMPLE 28

3β-acetoxy-11β-hydroxy-2'-acetoxymethyl-6'β-methoxy-5',6'-dihydro-5α-androstano-[17,16α-c]-pyran Using the procedure described in Example 1, but replacing 16-dehydropregnenolone acetate by 5α-pregn-16-ene-3β,11β,21-triol-20-one 3,21-diacetate, there are obtained 3β - acetoxy - 11β-hydroxy-2'-acetoxymethyl-6'β-methoxy-5',6'-dihydro-5α-androstano-[17,16α-c] - pyran, 3β-acetoxy-11β-hydroxy-2'-acetoxy-methyl-6'β - methoxy-5',6' - dihydro - 5α - androstano - [17,16β-c]-pyran, 3β-acetoxy - 11β - hydroxy - 2'-acetoxymethyl-6'α-methoxy-5',6'-dihydro-5α-androstano-[17,16β-c] - pyran, and 3β-acetoxy - 11β - hydroxy - 2'-acetoxymethyl-6'α-methoxy-5',6'-dihydro-5α-androstano-[17,16α-c]-pyran.

EXAMPLE 29

3β-acetoxy-2'-methyl-6'β-methoxy-5',6'-dihydroandrostano-[17,16α-c]-pyran

Using the procedure described in Example 1, but replacing 16-dehydroprengnenolone acetate by 5β-pregn-16-ene-3β-ol-20-one acetate (Marker et al., J. Am. Chem. Soc. 64, 215, 1942), there are obtained 3β-acetoxy-2'-methyl - 6'β - methoxy - 5',6' - dihydro - 5β - androstano-[17,16α - c] - pyran, 3β-acetoxy-2'-methyl-6'β-methoxy-5',6' - dihydro - 5β - androstano - [17,16β - c] - pyran, 3β-acetoxy-2'-methyl-6'α-methoxy-5',6'-dihydro-5β - androstano - [17,16β-c] - pyran, and 3β-acetoxy-2'-methyl-6'α-methoxy-5',6'-dihydro-5β-androstano-[17,16α-c]-pyran.

Example 30

*3α-acetoxy-11-keto-2'-methyl-6'β-methoxy-5',6-dihydroandrostano-[17,16α-c]-pyran*

Using the procedure described in Example 1, but replacing 16-dehydropregnenolone acetate by pregn-16-ene-3α-ol-11,20-dione acetate (Nes and Mason, J. Am. Chem. Soc. 73, 4765, 1951), there are obtained
3α-acetoxy-11-keto-2'-methyl-6'β-methoxy-5',6'-dihydroandrostano-[17,16α-c]-pyran,
3α-acetoxy-11-keto-2'-methyl-6'β-methoxy-5',6'-dihydroandrostano-[17,16β-c]-pyran,
3α-acetoxy-11-keto-2'-methyl-6'α-methoxy-5',6'-dihydroandrostano-[17,16β-c]-pyran, and
3α-acetoxy-11-keto-2'-methyl-6'α-methoxy-5',6'-dihydroandrostano-[17,16α-c]-pyran.

Example 31

*3α-acetoxy-11β-hydroxy-2'-methyl-6'β-methoxy-5',6'-dihydroandrostano-[17,16α-c]-pyran*

Using the procedure described in Example 1, but replacing 16-dehydropregnenolone acetate by 5β-pregn-16-ene-3α,11β-diol-20-one 3-acetate, there are obtained
3α-acetoxy-11β-hydroxy-2'-methyl-6'β-methoxy-5',6'-dihydroandrostano-[17,16α-c]-pyran,
3α-acetoxy-11β-hydroxy-2'-methyl-6'β-methoxy-5',6'-dihydroandrostano-[17,16β-c]-pyran,
3α-acetoxy-11β-hydroxy-2'-methyl-6'α-methoxy-5'-6'-dihydroandrostano-[17,16β-c]-pyran, and
3α-acetoxy-11β-hydroxy-2'-methyl-6'α-methoxy-5',6'-dihydroandrostano-[17,16α-c]-pyran.

Example 32

*3β-acetoxy-2'-methyl-6'β-methoxy-5'6'-dihydro-5α-androstano-[17,16α-c]-pyran*

Using the procedure described in Example 1, but replacing 16-dehydropregnenolone acetate by 5α-pregn-16-ene-3β-ol-20-one acetate [prepared by acetylation of 5α-pregn-16-ene-3β-ol-20-one (Klyne et al., Biochem. J. 43, 231, 1948)], there are obtained
3β-acetoxy-2'-methyl-6'β-methoxy-5',6'-dihydro-5α-androstano-[17,16α-c]-pyran,
3β-acetoxy-2'-methyl-6'β-methoxy-5',6'-dihydro-5α-androstano-[17,16β-c]-pyran,
3β-acetoxy-2'-methyl-6'α-methoxy-5',6'-dihydro-5α-androstano-[17,16β-c]-pyran, and
3β-acetoxy-2'-methyl-6'α-methoxy-5',6'-dihydro-5α-androstano-[17,16α-c]-pyran.

Example 33

*3α-acetoxy-2'-methyl-6'β-methoxy-5',6'-dihydroandrostano-[17,16α-c]-pyran*

Using the procedure described in Example 1, but replacing 16-dehydropregnenolone acetate by 5β-pregn-16-ene-3α-ol-20-one acetate [prepared by acetylation of 5β-pregn-16-ene-3α-ol-20-one (Fukushima et al., J. Biol. Chem. 210, 129, 1954)], there are obtained
3α-acetoxy-2'-methyl-6'β-methoxy-5',6'-dihydroandrostano-[17,16α-c]-pyran,
3α-acetoxy-2'-methyl-6'β-methoxy-5',6'-dihydroandrostano-[17,16β-c]-pyran,
3α-acetoxy-2'-methyl-6'α-methoxy-5',6'-dihydroandrostano-[17,16β-c]-pyran, and
3α-acetoxy-2'-methyl-6'α-methoxy-5',6'-dihydroandrostano-[17,16α-c]-pyran.

Example 34

*Δ$^5$-3β-acetoxy-2'-methyl-6'β-nitro-5',6'-dihydroandrostano-[17,16α-c]-pyran*

Using the procedure described in Example 1, but replacing methyl vinyl ether by nitroethylene and employing the technique for preparation of nitroethylene in situ as described by Kaplan and Shechter, J. Org. Chem. 26, 982 (1961), there are obtained
Δ$^5$-3β-acetoxy-2'-methyl-6'β-nitro-5'6'-dihydroandrostano-[17,16α-c]-pyran,
Δ$^5$-3β-acetoxy-2'-methyl-6'β-nitro-5',6'-dihydroandrostano-[17,16β-c]-pyran,
Δ$^5$-3β-acetoxy-2'-methyl-6'α-nitro-5',6'-dihydroandrostano-[17,16β-c]-pyran, and
Δ$^5$-3β-acetoxy-2'-methyl-6'α-nitro-5',6'-dihydroandrostano-[17,16α-c]-pyran.

Example 35

*Δ$^5$-3β-acetoxy-2'-methyl-6'β-chloro-5',6'-dihydroandrostano-[17,16α-c]-pyran*

Using the procedure described in Example 1, but replacing methyl vinyl ether by vinyl chloride, there are obtained
Δ$^5$-3β-acetoxy-2'-methyl-6'β-chloro-5'6'-dihydroandrostano-[17,16α-c]-pyran,
Δ$^5$-3β-acetoxy-2'-methyl-6'β-chloro-5',6'-dihydroandrostano-[17,16β-c]-pyran,
Δ$^5$-3β-acetoxy-2'-methyl-6'α-chloro-5',6'-dihydroandrostano-[17,16α-c]-pyran, and
Δ$^5$-3β-acetoxy-2'-methyl-6'α-chloro-5',6'-dihydroandrostano-[17,16β-c]-pyran.

Example 36

*Δ$^5$-3β-acetoxy-2'-methyl-6'β-mercapto-5',6'-dihydroandrostano-[17,16α-c]-pyran*

Using the procedure described in Example 1, but replacing methyl vinyl ether by vinyl mercaptan, there are obtained
Δ$^5$-3β-acetoxy-2'-methyl-6'β-mercapto-5',6'-dihydroandrostano-[17,16α-c]-pyran,
Δ$^5$-3β-acetoxy-2'-methyl-6'β-mercapto-5',6'-dihydroandrostano-[17,16β-c]-pyran,
Δ$^5$-3β-acetoxy-2'-methyl-6'α-mercapto-5',6'-dihydroandrostano-[17,16β-c]-pyran, and
Δ$^5$-3β-acetoxy-2'-methyl-6'α-mercapto-5',6'-dihydroxyandrostano-[17,16α-c]-pyran.

Example 37

*Δ$^5$-3β-acetoxy-2'-methyl-6'β-aldehyde-5',6'-dihydroandrostano-[17,16α-c]-pyran*

Using the procedure described in Example 1, but replacing methyl vinyl ether by acrolein, there are obtained
Δ$^5$-3β-acetoxy-2'-methyl-6'β-aldehydo-5',6'-dihydroandrostano-[17,16α-c]-pyran,
Δ$^5$-3β-acetoxy-2'-methyl-6'β-aldehydo-5',6'-dihydroandrostano-[17,16β-c]-pyran,
Δ$^5$-3β-acetoxy-2'-methyl-6'α-aldehydo-5',6'-dihydroandrostano-[17,16β-c]-pyran, and
Δ$^5$-3β-acetoxy-2'-methyl-6'α-aldehydo-5',6'-dihydroandrostano-[17,16α-c]-pyran.

Example 38

*Δ$^5$-3β-acetoxy-2'-methyl-6'β-ethoxy-5',6'-dihydroandrostano-[17,16α-c]pyran*

Using the procedure described in Example 1, but replacing methyl vinyl ether by ethyl vinyl ether, there are obtained Δ$^5$ - 3β - acetoxy-2'-methyl-6'β-ethoxy-5',6'-dihydroandrostano-[17,16α-c]-pyran, Δ$^5$-3β-acetoxy-2'-methyl-6'β-ethoxy-5',6'-dihydroandrostano-[17,16β-c]-pyran, Δ$^5$-3β-acetoxy-2'-methyl-6'α - ethoxy - 5',6' - dihydroandrostano-[17,16β-c]-pyran, and Δ$^5$-3β-acetoxy-2'-methyl-6'α-ethoxy-5',6'-dihydroandrostano-[17,16α-c]-pyran.

Example 39

*Δ$^5$-3β-acetoxy-2'-methyl-6'β-isopropoxy-5',6'-dihydroandrostano-[17,16α-c]-pyran*

Using the procedure described in Example 1, but replacing methyl vinyl ether by isopropyl vinyl ether (British Patent 369,297), there are obtained Δ$^5$-3β-acetoxy-2'-methyl-6'β-isopropoxy - 5',6' - dihydroandrostano-[17, 16α-c]-pyran, Δ⁵-3β-acetoxy-2'-methyl - 6'β - isopropoxy-5',6'-dihydroandrostano-[17,16β-c]-pyran, Δ⁵-3β-acetoxy-2'-methyl-6'α-isopropoxy-5',6' - dihydroandrostano - [17,16β-c]-pyran, and Δ⁵-3β-acetoxy-2'-methyl-6'α-isopropoxy 5',6'-dihydroandrostano-[17,16α-c]-pyran.

EXAMPLE 40

Δ⁵-3β-acetoxy-2'-methyl-6'β-octyloxy-5',6'-dihydroandrostano-[17,16α-c]-pyran

Using the procedure described in Example 1, but replacing methyl vinyl ether by octyl vinyl ether, there are obtained Δ⁵-3β-acetoxy-2'-methyl-6'β-octyloxy - 5',6' - dihydroandrostano-[17,16α-c]-pyran, Δ⁵-3β - acetoxy - 2'-methyl-6'β-octyloxy - 5',6'-dihydroandrostano-[17,16β-c]-pyran, Δ⁵-3β - acetoxy-2'-methyl-6'α-octyloxy-5',6'-dihydroandrostano-[17,16β-c]-pyran, and Δ⁵-3β-acetoxy-2'-methyl - 6'α - octyloxy - 5',6' - dihydroandrostano - [17,16α-c]-pyran.

EXAMPLE 41

Δ⁵-3β,6'β-diacetoxy-2'-methyl-5',6'-dihydroandrostano-[17,16α-c]-pyran

Using the procedure described in Example 1, but replacing methyl vinyl ether by vinyl acetate, there are obtained Δ⁵-3β,6'β-diacetoxy-2'-methyl-5',6'-dihydroandrostano-[17,16α-c]pyran, Δ⁵-3β,6'β-diacetoxy-2'-methyl-5',6'-dihydroandrostano-[17,16β-c]-pyran, Δ⁵-3β,6α-diacetoxy-2'-methyl-5',6'-dihydroandrostano-[17,16β-c] - pyran, and Δ⁵-3β,6'α - diacetoxy - 2'-methyl-5',6'-dihydroandrostano-[17,16α-c]-pyran.

EXAMPLE 42

Δ⁵-3β-acetoxy-2'-methyl-6'β-butyroxy-5',6'-dihydroandrostano-[17,16α-c]-pyran

Using the procedure described in Example 1, but replacing methyl vinyl ether by vinyl butyrate, there are obtained Δ⁵-3β-acetoxy-2'-methyl-6'β-butyroxy-5',6'-dihydroandrostano-[17,16α-c]-pyran, Δ⁵-3β-acetoxy-2'-methyl-6'β-butyroxy-5',6'-dihydroandrostano-[17,16β-c] - pyran, Δ⁵-3β - acetoxy - 2' - methyl-6'α-butyroxy-5',6'-dihydroandrostano-[17,16β-c]-pyran, and Δ⁵-3β-acetoxy-2'-methyl-6'α - butyroxy - 5',6' - dihydroandrostano-[17,16α-c]-pyran.

EXAMPLE 43

Δ⁵-3β-acetoxy-2'-methyl-6'β-phenoxy-5',6'-dihydroandrostano-[17,16α-c]-pyran

Using the procedure described in Example 1, but replacing methyl vinyl ether by vinyl phenyl ether, there are obtained Δ⁵-3β-acetoxy-2'-methyl-6'β-phenoxy-5',6'-dihydroandrostano - [17,16α-c]-pyran, Δ⁵-3β-acetoxy-2'-methyl-6'β - phenoxy - 5',6' - dihydroandrostano-[17,16β-c]-pyran, Δ⁵-3β-acetoxy-2'-methyl-6'α-phenoxy-5',6'-dihydroandrostano-[17,16β-c]-pyran, and Δ⁵-3β-acetoxy-2'-methyl-6'α-phenoxy-5',6'-dihydroandrostano-[17,16α-c]-pyran.

EXAMPLE 44

Δ⁵-3β-acetoxy-2'-methyl-6'β-acetyl-5',6'-dihydroandrostano-[17,16α-c]-pyran

Using the procedure described in Example 1, but replacing methyl vinyl ether by methyl vinyl ketone, there are obtained Δ⁵-3β-acetoxy-2'-methyl-6'β-acetyl-5',6'-dihydroandrostano-[17,16α-c]-pyran, Δ⁵-3β - acetoxy - 2'-methyl-6'β-acetyl-5',6' - dihydroandrostano - [17,16β-c]-pyran, Δ⁵-3β-acetoxy-2'-methyl-6'α-acetyl-5',6' - dihydroandrostano-[17,16β-c]-pyran, and Δ⁵-3β-acetoxy-2'-methyl-6'α-acetyl-5',6'-dihydroandrostano-[17,16α-c]-pyran.

EXAMPLE 45

Δ⁵-3β-acetoxy-2'-methyl-6'β-pentanoyl-5',6'-dihydroandrostano-[17,16α-c]-pyran

Using the procedure described in Example 1, but replacing methyl vinyl ether by butyl vinyl ketone (U.S. Patent 2,398,685), there are obtained Δ⁵-3β-acetoxy-2'-methyl-6'β - pentanoyl - 5',6' - dihydroandrostano - [17,16α-c]-pyran, Δ⁵-3β - acetoxy - 2'-methyl-6'β-pentanoyl-5',6'-dihydroandrostano-[17,16β-c]-pyran, Δ⁵-3β-acetoxy-2'-methyl-6'α-pentanoyl - 5',6' - dihydroandrostano - [17,16β-c]-pyran, and Δ⁵-3β-acetoxy-2'-methyl-6'α-pentanoyl-5',6'-dihydroandrostano-[17,16α-c]-pyran.

EXAMPLE 46

Δ⁵-3β-acetoxy-2'-methyl-6'β-butylmercapto-5',6'-dihydroandrostano-[17,16α-c]-pyran Using the procedure described in Example 1, but replacing methyl vinyl ether by butyl vinyl sulfide (U.S. 2,402,878), there are obtained Δ⁵-3β-acetoxy-2'-methyl-6'β - butylmercapto-5',6'-dihydroandrostano-[17,16α-c]-pyran, Δ⁵-3β-acetoxy-2'-methyl-6'β-butylmercapto-5',6'-dihydroandrostano - [17,16β-c]-pyran, Δ⁵-3β-acetoxy-2'-methyl-6'α-butylmercapto-5',6'-dihydroandrostano - [17,16β-c]-pyran, and Δ⁵-3β-acetoxy-2'-methyl-6'α-butylmercapto-5',6'-dihydroandrostano-[17,16α-c]-pyran.

EXAMPLE 47

Δ⁵-3β-acetoxy-2'-methyl-6'β-phenylmercapto-5',6'-dihydroandrostano-[17,16α-c]-pyran Using the procedure described in Example 1, but replacing methyl vinyl ether by phenyl vinyl sulfide (French Patent 777,427), there are obtained Δ⁵-3β-acetoxy-2'-methyl - 6'β - phenylmercapto - 5',6' - dihydroandrostano-[17,16α-c]-pyran, Δ⁵-3β-acetoxy-2'-methyl-6'β-phenylmercapto-5',6' - dihydroandrostano-[17,16β-c]-pyran, Δ⁵-3β-acetoxy-2'-methyl - 6'α - phenylmercapto - 5',6'-dihydroandrostano - [17,16β - c] - pyran, and Δ⁵ - 3β-acetoxy - 2'-methyl-6'α - phenylmercapto - 5',6' - dihydroandrostano-[17,16α-c]-pyran.

EXAMPLE 48

Δ⁵-3β-acetoxy-2'-methyl-5'-amyl-6'β-ethoxy-5',6'-dihydroandrostano-[17,16α-c]-pyran Using the procedure described in Example 1, but replacing methyl vinyl ether by 1-heptenyl ethyl ether (Monatsche, 51, 234, 1929), there are obtained Δ⁵-3β-acetoxy - 2' - methyl - 5' - amyl-6'β-ethoxy-5',6'-dihydroandrostano-[17,16α-c]-pyran, Δ⁵-3β-acetoxy-2'-methyl-5'-amyl-6'β-ethoxy - 5',6'-dihydroandrostano-[17,16β-c]-pyran, Δ⁵-3β-acetoxy-2'-methyl-5'-amyl - 6'α - ethoxy - 5',6'-dihydroandrostano-[17,16β-c]-pyran, and Δ⁵-3β-acetoxy-2'-methyl-5'-amyl-6'α-ethoxy - 5',6' - dihydroandrostano-[17,16α-c]-pyran.

EXAMPLE 49

Δ⁵-3β-acetoxy-2'-methyl-6'-ethoxyandrostano-[17,16α-c]-pyran

Using the procedure described in Example 1, but replacing methyl vinyl ether by ethoxyacetylene, there are obtained Δ⁵-3β-acetoxy-2'-methyl - 6'-ethoxyandrostano-[17,16α-c]-pyran, and Δ⁵-3β-acetoxy-2'-methyl-6'-ethoxy-[17,16β-c]-pyran.

EXAMPLE 50

Δ⁵-3β-acetoxy-11-keto-2'-methyl-6'β-methoxy-5'6'-dihydroandrostano-[17,16α-c]-pyran Using the procedure described in Example 1, but replacing 16-dehydropregnenolone acetate by 3β-acetoxy-5,16-pregnadien-11,20-dione (Rothman and Wall, supra), there are obtained Δ⁵-3β-acetoxy-11-keto-2'-methyl-6'β-methoxy - 5',6' - dihydroandrostano-[17,16α-c]-pyran, Δ⁵-3β-acetoxy-11-keto-2'-methyl-6'β-methoxy - 5',6'-dihydroandrostano-[17,16β-c]-pyran, Δ⁵-3β-acetoxy - 11 - keto-2'-methyl-6'α-methoxy - 5',6'-dihydroandrostano-[17,16α-c]-pyran, and Δ⁵-3β-acetoxy-11-keto-2'-methyl-6'α-methoxy-5',6'-dihydroandrostano-[17,16β-c]-pyran.

EXAMPLE 51

Δ⁵-3β,11α-dihydroxy-2'-methyl-6'β-methoxy-5',6'-dihydroandrostano-[17,16α-c]-pyran Using the procedure described in Example 1, but replacing 16-dehydropregnenolone acetate by 3β,11α-diacetoxy-5,6-pregnadiene-20-one (Rothman and Monroe, supra), there are obtained Δ$^5$-3β,11α-diacetoxy-2'-methyl-6'β-methoxy - 5',6'-dihydroandrostano-[17,16α-c]-pyran, Δ$^5$-3β-11α-diacetoxy - 2' - methyl-6'β-methoxy-5',6'-dihydroandrostano - [17,16β-c]-pyran, Δ$^5$-3β,11α-diacetoxy-2'-methyl-6'α-methoxy - 5',6'-dihydroandrostano-[17,16β-c]-pyran, and Δ$^5$-3β,11α-diacetoxy-2'-methyl - 6'α - methoxy-5',6'-dihydroandrostano-[17,16α-c]-pyran.

The above compounds are hydrolyzed, using the procedure described in Example 2, to obtain the corresponding free 3β,11α-dihydroxy compounds, namely, Δ$^5$-3β,11α-dihydroxy-2'-methyl-6'β - methoxy - 5',6' - dihydroandrostano-[17,16α-c]-pyran and the corresponding 6'β,16β-, 6'α,16α-, and 6'α,16β-epimers thereof.

EXAMPLE 52

Δ$^5$-3β-acetoxy-11β-hydroxy-2'-methyl-6'β-methoxy-5',6'-dihydroandrostano-[17,16α-c]-pyran Using the procedure described in Example 1, but replacing 16-dehydropregnenolone acetate by 3β-acetoxy-11β-hydroxy-5,16-pregnadiene-20-one, there are obtained Δ$^5$-3β-acetoxy-11β-hydroxy-2'-methyl - 6'β-methoxy-5',6'-dihydroandrostano-[17,16α-c] - pyran, Δ$^5$-3β-acetoxy-11β-hydroxy-2'-methyl-6'β-methoxy-5',6' - dihydroandrostano-[17,16β-c]-pyran, Δ$^5$-3β-acetoxy - 11β-hydroxy-2'-methyl-6'α-methoxy-5',6'-dihydroandrostano - [17,16α-c]-pyran, and Δ$^5$-3β-acetoxy-11β-hydroxy-2'-methyl - 6'α - methoxy-5',6'-dihydroandrostano-[17,16β-c]-pyran.

EXAMPLE 53

Δ$^5$-3β-acetoxy-6-methyl-11-keto-2'-methyl-6'β-methoxy-5',6'-dihydroandrostano-[17,16α-c]-pyran Using the procedure described in Example 1, but replacing 16-dehydropregnenolone acetate by 3β-acetoxy-6-methyl-5,16-pregnadiene-11,20-dione, there are obtained Δ$^5$-3β-acetoxy-6-methyl-11-keto-2'-methyl - 6'β-methoxy-5',6'-dihydroandrostano-[17,16α-c]-pyran, Δ$^5$-3β-acetoxy-6-methyl-11-keto-2'-methyl-6'β-methoxy - 5',6' - dihydroandrostano-[17,16β-c]-pyran, Δ$^5$-3β-acetoxy - 6-methyl-11-keto-2'-methyl-6'α - methoxy - 5',6' - dihydroandrostano-[17,16β-c]-pyran, and Δ$^5$-3β-acetoxy-6-methyl-11-keto-2'-methyl-6'α-methoxy-5',6'-dihydroandrostano - [17,16α-c]-pyran.

EXAMPLE 54

Δ$^5$-3β-acetoxy-6-methyl-11β-hydroxy-2'-methyl-6'β-methoxy-5',6'-dihydroandrostano-[17,16α-c]-pyran Using the procedure described in Example 1, but replacing 16-dehydropregnenolone acetate by 3β-acetoxy-6-methyl-11β-hydroxy-5,16-pregnadiene-20-one, there are obtained Δ$^5$-3β-acetoxy-6-methyl - 11β-hydroxy-2'-methyl-6'β-methoxy-5',6'-dihydroandrostano - [17,16α-c]-pyran, Δ$^5$-3β-acetoxy-6-methyl-11β - hydroxy - 2' - methyl - 6'β-methoxy - 5',6' - dihydroandrostano - [17,16β-c] - pyran, Δ$^5$-3β-acetoxy-6-methyl-11β-hydroxy-2'-methyl - 6'α-methoxy-5',6'-dihydroandrostano-[17-16β-c]-pyran, and Δ$^5$-3β-acetoxy-6-methyl-11β-hydroxy - 2' - methyl-6'α-methoxy-5',6'-dihydroandrostano-[17,16α-c]-pyran.

EXAMPLE 55

Δ$^5$ - 3β - acetoxy-6-methyl-11β-hydroxy-2'-acetoxymethyl-6'β - methoxy - 5',6' - dihydroandrostano - [17,16α-c]-pyran Using the procedure described in Example 1, but replacing 16-dehydropregnenolone acetate by 3β,21-diacetoxy-6-methyl-11β-hydroxy-5,16-pregnadiene-20-one, there are obtained Δ$^5$-3β-acetoxy-6-methyl-11β-hydroxy-2'-acetoxymethyl - 6'β - methoxy - 5',6'-dihydroandrostano-[17,16α-c] - pyran, Δ$^5$ - 3β-acetoxy-6-methyl-11β-hydroxy-2'-acetoxymethyl-6'β-methoxy-5',6'-dihydroandrostano-[17,16β-c]-pyran, Δ$^5$-3β-acetoxy-6-methyl-11β-hydroxy-2'-acetoxymethyl - 6'α-methoxy-5',6'-dihydroandrostano-[17,16β-c]-pyran, and Δ$^5$-3β-acetoxy-6-methyl-11β-hydroxy-2'-acetoxymethyl-6'α-methoxy-5',6'-dihydroandrostano-[17,16α-c]-pyran.

EXAMPLE 56

Δ$^5$-3β-propionyloxy-2'-methyl-6'β-methoxy-5',6'-dihydroandrostano-[17,16α-c]-pyran A mixture of 1 g. of Δ$^5$-3β-hydroxy-2'-methyl-6'β-methoxy-5',6'-dihydroandrostano-[17,16α-c]-pyran, 10 ml. of pyridine and 10 ml. of propionic anhydride is allowed to stand for several hours at room temperature before being poured into water. The solid which separates is isolated by filtration, washed with water, and recrystallized from aqueous methanol. There is thus obtained Δ$^5$-3β-propionyloxy - 2'-methyl-6'β-methoxy-5',6'-dihydroandrostano-[17,16α-c]-pyran in the form of a crystalline solid.

Using the above procedure, but replacing propionic anhydride by the appropriate acid anhydride, there are prepared other 3-acylates of Δ$^5$-3β-hydroxy-2'-methyl-6'β-methoxy-5',6'-dihydroandrostano-[17,16α-c]-pyran, such as the 3-isobutyrate, 3-hexanoate, 3-phenylacetate, 3β-phenylpropionate, 3-hemisuccinate, 3-cyclopentylpropionate, 3-benzoate, 3-trimethylacetate, and the like.

Similarly by hydrolyzing, under alkaline conditions using the procedure described in Example 2, any of the 3- and/or 2'-acetates, described in Examples 6, 10 to 15, 18 to 20, and 23 to 50, and acylating the resulting free alcohols using the appropriate acid anhydride under the conditions described above, there can be obtained the corresponding acylates in which the acetyl group of the original compound is replaced by the acyl group of a hydrocarbon carboxylic acid, other than acetic acid, containing from 1 to 12 carbon atoms, inclusive.

EXAMPLE 57

16α-(2-oxoethyl)-5-pregnen-3β-ol-20-one

A solution of 1.1 g. of Δ$^5$-3β-hydroxy-2'-methyl-6'β-methoxy-5',6'-dihydroandrostano-[17,16α-c]-pyran (prepared as described in Example 2) in 50 ml. of tetrahydrofuran was treated with 2.5 ml. of 25 percent aqueous sulfuric acid and the mixture was allowed to stand for 18 hr. at room temperature. The mixture so obtained was extracted with methylene chloride and the methylene chloride extracts were washed with aqueous sodium bicarbonate solution, then with water, and dried over anhydrous sodium sulfate. The dried solution was filtered and the filtrate was evaporated to dryness. The residue was dissolved in methylene chloride and chromatographed on a column of magnesium silicate (Florisil). The column was eluted with Skellysolve B containing increasing proportions of acetone and those fractions which, on the basis of infrared and paper chromatographic analysis were found to contain the desired product, were combined and evaporated to dryness and crystallized from acetone-Skellysolve B mixture. There was thus obtained 0.25 g. of 16α-(2-oxoethyl)-5-pregnene-3β-ol-20-one in the form of a crystalline solid having a melting point of 192 to 198° C. An analytical sample having a melting point of 197 to 201° C. was obtained by further recrystallization from a mixture of acetone and Skellysolve B.

Analysis.—Calcd. for $C_{23}H_{34}O_3$: C, 77.05; H, 9.56. Found: C, 77.03; H, 9.80.

The infrared spectrum of the compound (mineral oil mull) exhibited maxima at 3540, 2720, 1720, 1685, 1240, 1185, and 1065 reciprocal centimeters.

The above chromatographic separation also yielded fractions of eluate which were shown by infrared spectrum analysis to contain a material other than the above 16α-(2-oxoethyl) - 5-pregnene-3β-ol-20-one. Said fractions were combined and evaporated to dryness and the residue was recrystallized from methanol. There was thus obtained 90 mg. of 2,3,4,4a,4b,5,6,6a,6b,7,10,10a,11,11a,11b, 12 - hexadecahydro - 4a,6a - dimethyl - 7 - oxo-1H-indeno- (2,1-a)-phenanthrene-2-ol having a melting point of 226 to 235° C. and having the following structural formula:

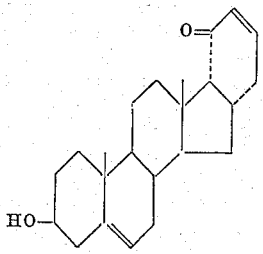

An analytical sample having a melting point of 238 to 242° C. was obtained by further recrystallization from methanol. The infrared spectrum of the compound (mineral oil mull) exhibited maxima at 3570, 3400, 3260, 3040, 3020, 1655, 1645, 1613, 1097, 1077, 1067, 1057, 1038, 1020, and 1000 reciprocal centimeters. The ultraviolet spectrum of the compound (ethanol solution) exhibited a maximum at 232 millimicrons ($\epsilon=8,450$).

The compound exhibits valuable properties as an antiinflammatory, progestational, central nervous system regulating, glucocorticoid, antihormonal, lipid-mobilizing, hypotensive, cardiotonic, cholesterol lowering, and antifertility agent.

Using the above procedure, but replacing $\Delta^5$-3β-hydroxy - 2' - methyl - 6'β - methoxy - 5',6' - dihydroandrostano-[17,16α-c]-pyran by $\Delta^4$-3-keto-2'-methyl-6'β-methoxy - 5',6' - dihydroandrostano - [17,16α - c] - pyran, $\Delta^4$ - 3 - keto - 6α - methyl - 2' - methyl - 6'β - methoxy-5',6'-dihydroandrostano-[17,16α-c]-pyran and $\Delta^{1,4,9(11)}$-3 - keto - 6α - methyl - 2' - methyl - 6'β - methoxy - 5',6'-dihydroandrostano-[17,16α-c]-pyran, there are obtained 16α - (2 - oxoethyl)progesterone, 16α - (2 - oxoethyl)-6α-methylprogesterone, and 16α-(2-oxoethyl)-6α-methyl-$\Delta^{4,9,(11)}$-pregnadiene-3,20-dione, respectively.

EXAMPLE 58

16α-methylpregnenolone

A mixture of 1.3 g. of 16α-(2-oxoethyl)-5-pregnen-3β-ol-20-one and 0.1 g. of 5 percent palladium-on-charcoal catalyst was heated at 200 to 220° C. under vacuum for 20 minutes with stirring. The mixture was cooled, diluted with methylene chloride and filtered. The insoluble material was washed with hot methylene chloride, and the filtrate and washings were combined and evaporated to dryness. The residual orange colored oil was dissolved in methylene chloride and chromatographed on a column of magnesium silicate (Florisil). The column was eluted with Skellysolve B containing increasing proportions of acetone and those fractions which, on the basis of infrared and chromatographic analysis, were found to contain the desired product were combined and evaporated to dryness. The residue was recrystallized from acetone. There was thus obtained 16α-methylpregnenolone in the form of a crystalline solid having a melting point of 185 to 191° C., undepressed by admixture with an authentic sample and with an infrared spectrum identical with that of authentic material.

Using the above procedure, but replacing 16α-(2-oxoethyl)-5-pregnen-3β-ol-20-one by 16α-(2-oxoethyl)-progesterone, 16α - (2 - oxoethyl) - 6α - methylprogesterone, and 16α-(2-oxoethyl)-6α-methyl-$\Delta^{4,9(11)}$-pregnadiene-3,20-dione, there are obtained 6α-methylprogesterone, 6α,16α - dimethylprogesterone and 6α,16α - dimethyl-$\Delta^{4,9(11)}$-pregnadiene-3,20-dione, respectively.

EXAMPLE 59

17α - hydroxy-3β - acetoxy - 5 - pregnene - 20 - one - 16α-acetic acid γ-lactone, 17α-hydroxy-3β-acetoxy-5-pregnene-20-one-16α-acetaldehyde γ-lactol, and 17α,20-dihydroxy-3-β-acetoxy-5-pregnene-16α-acetic acid γ-lactone A solution of 10.1 g. of $\Delta^5$-3β-acetoxy-2'-methyl-6'β-methoxy - 5',6'-dihydroandrostano - [17,16α - c] - pyran in 200 ml. of tetrahydrofuran was mixed with 10.1 g. of osmium tetroxide and the mixture was allowed to stand for 3 days at room temperature. At the end of this time, hydrogen sulfide was bubbled through the solution for 15 minutes and the solid material which separated was isolated by filtration. The insoluble material was extracted with hot dioxane and the extracts and filtrate were combined and evaporated to dryness. The residue (8.93 g.) was combined with 3.1 g. of material obtained from a similar run (employing 4.3 g. of starting steroid). The combined material (12.03 g.) was dissolved in 30 ml. of methylene chloride and chromatographed on a column of magnesium silicate (Florisil). The column was eluted with Skellysolve B containing increasing proportions of acetone and the fractions which, on the basis of infrared and paper chromatographic analysis, were found to contain the desired products, were combined and evaporated to dryness to give the following materials.

(a) 0.502 g. of 17α-hydroxy-3β-acetoxy-5-pregnen-20-one-16α-acetaldehyde γ-lactol which after two recrystallizations from a mixture of acetone and Skellysolve B had a melting point of 184 to 186° C.

*Analysis.*—Calcd. for $C_{25}H_{36}O_5 \cdot C_3H_6O$: C, 70.85; H, 8.76. Found: C, 70.21; H, 8.76.

The infrared spectrum of this compound (mineral oil mull) exhibited maxima at 3440, 1745, 1710, 1255, 1215 and 1035 reciprocal centimeters.

(b) 1.281 g. of 17α-hydroxy-3β-acetoxy-5-pregnene-20-one-16α-acetic acid γ-lactone which, after recrystallization from a mixture of acetone and Skellysolve B, had a melting point of 176 to 188° C. (sinters at 110° C.) identical with material prepared in Example 61.

*Analysis.*—Calcd. for $C_{25}H_{34}O_5$: C, 72.43; H, 8.47. Found: C, 72.06; H, 8.39.

(c) 1.282 g. of 17α,20-dihydroxy-3β-acetoxy-5-pregnene-16α-acetic acid γ-lactone which, after recrystallization from ether and then from a mixture of acetone and Skellysolve B, had a melting point of 235 to 240° C.

*Analysis.*—Calcd. for $C_{25}H_{36}O_5$: C, 72.08; H, 8.71. Found: C, 71.97; H, 8.57.

The infrared spectrum of the compound (mineral oil mull) exhibited maxima at 3480, 1770, 1730, 1240, 1215, 1180, 1100, 1040 and 1015 reciprocal centimeters.

Using the above procedure but replacing $\Delta^5$-3β-acetoxy-2' - methyl-6'β-methoxy-5',6'-dihydroandrostano-[17,16α-c]-pyran by the corresponding 16β-epimer, there are obtained 17α - hydroxy-3β-acetoxy-5-pregnen-20-one-16β-acetic acid, 17α-hydroxy-3β-acetoxy-5-pregnene-20-one-16β-acetaldehyde, and 17α,20-dihydroxy-3β-acetoxy-5-pregnene-16β-acetic acid.

EXAMPLE 60

17α-hydroxy-3β-acetoxy-5-pregnene-20-one-16α-acetic acid γ-lactone

A solution of 0.5 g. of 17α,20-dihydroxy-3β-acetoxy-5-pregnene-16α-acetic acid γ-lactone in 10 ml. of pyridine was treated with a complex prepared from 0.5 g. of chromic anhydride and 10 ml. of pyridine. The mixture was allowed to stand at room temperature for 18 hr. before being treated with a mixture of toluene and ether. The mixture so obtained was filtered and the filtrate was washed with water and dried over anhydrous sodium sulfate. The dried solution was filtered and the filtrate was evaporated to dryness. The residue was recrystallized twice from methanol, then from a mixture of acetone and Skellysolve B, and finally from methanol. There was thus obtained 17α-hydroxy-3β-acetoxy-5-pregnene-20-one-16α-acetic acid γ-lactone in the form of a crystalline solid having a melting point of 186 to 188° C.

*Analysis.*—Calcd. for $C_{25}H_{34}O_5$: C, 72.43; H, 8.27. Found: C, 72.06; H, 8.39.

The infrared spectrum of the compound (mineral oil mull) exhibited maxima at 1785, 1730, 1720, 1710, 1675, 1250, 1155, and 1035 reciprocal centimeters.

EXAMPLE 61

*3β,17α-dihydroxy-20-oxopregn-5-ene-16α-acetic acid γ-lactone*

A solution of 1.34 g. of 17α-hydroxy-3β-acetoxy-5-pregnene-20-one-16α-acetic acid γ-lactone in 100 ml. of methanol containing 0.35 g. of p-toluenesulfonic acid monohydrate was stirred for 18 hr. at room temperature. At the end of this time, methylene chloride was added and the organic layer was separated and washed with aqueous sodium bicarbonate solution, followed by water. The washed solution was dried over anhydrous sodium sulfate and filtered. The filtrate was evaporated to dryness and the residue was recrystallized three times from a mixture of acetone and Skellysolve B. There was thus obtained 3β,17α-dihydroxy-20-oxopregn-5-ene-16α-acetic acid γ-lactone in the form of a crystalline solid having a melting point of 212 to 214° C.

*Analysis.*—Calcd. for $C_{23}H_{32}O_4$: C, 74.16; H, 8.66. Found: C, 74.26; H, 8.54

The infrared spectrum of the compound (mineral oil mull) exhibited maxima at 3400, 1775, 1250, 1210, 1155, 1065, 1040, and 1025 reciprocal centimeters.

EXAMPLE 62

*17α-hydroxy-3,20-dioxopregn-4-ene-16α-acetic acid γ-lactone*

A solution of 0.6 g. of 3β,17α-dihydroxy-20-oxopregn-5-ene-16α-acetic acid γ-lactone in 200 ml. of toluene was heated with stirring to boiling and water was removed azeotropically. To the dried solution so obtained was added 12 ml. of cyclohexanone and the mixture was heated under reflux for 30 minutes with removal of water azeotropically. To the dried solution was added a solution of 1.4 g. of aluminum isopropoxide in 20 ml. of cyclohexanone previously dried by azeotropic distillation and the resulting mixture was heated for 18 hr. under reflux with a water separator. The cooled reaction product was washed with saturated aqueous Rochelle salt solution, then with water, and dried over anhydrous sodium sulfate. The dried solution was filtered and the filtrate was evaporated to dryness. The residue was dissolved in 30 ml. of methylene chloride and chromatographed on a column of magnesium silicate (Florisil). The column was eluted with Skellysolve B containing increasing proportions of acetone and the fractions which, on the basis of infrared and paper chromatographic analysis, were found to contain the desired compound were combined and evaporated to dryness. The residue (0.306 g.) was recrystallized from acetone and Skellysolve B to obtain 0.235 g. of 17α-hydroxy-3,20-dioxopregn-4-ene-16α-acetic acid γ-lactone in the form of a crystalline solid having a melting point of 242 to 245° C. An analytical sample having a melting point of 246 to 248° C. was obtained by further recrystallization from a mixture of acetone and Skellysolve B.

*Analysis.*—Calcd. for $C_{23}H_{30}O_4$: C, 74.56; H, 8.16. Found: C, 74.53; H, 8.22.

The ultraviolet spectrum of the compound (ethanol solution) exhibited a maximum at 240 millimicrons ($\epsilon$=17,200). The infrared spectrum of the compound (mineral oil mull) exhibited maxima at 1778, 1707, 1677, 1615, 1225, 1205, 1185, 1145, 1130, 1080, 1060, 1040 and 1025 millimicrons.

EXAMPLE 63

*3β,21 - diacetoxy-17α - hydroxy - 5 - pregnene - 20 - one-16α-acetic acid γ-lactone and 3β,21-diacetoxy-17α,20-dihydroxy-5-pregnene-16α-acetic acid γ-lactone*

A solution of 3.8 g. of $\Delta^5$-3β-acetoxy-2'-acetoxymethyl-6'β-methoxy-5',6'-dihydroandrostano-[17,16α-c]-pyran in 50 ml. of tetrahydrofuran was stirred for 3 days at room temperature with 3.8 g. of osmium tetroxide. At the end of this time 100 ml. of dioxane was added and hydrogen sulfides was bubbled through the resulting solution for 15 minutes. The mixture so obtained was filtered and the filtrate was evaporated to dryness. The residue (3.5 g.) was dissolved in methylene chloride and chromatographed on a column of magnesium silicate. The column was eluted with Skellysolve B containing increasing proportions of acetone and those fractions which, on the basis of infrared and paper chromatographic analysis, were found to contain the desired products were evaporated to dryness to give the following products:

(a) 0.212 g. of 3β,21-diacetoxy-17α-hydroxy-5-pregnene-20-one-16α-acetic acid γ-lactone which after recrystallization from a mixture of acetone and Skellysolve B had a melting point of 241 to 243° C.

*Analysis.*—Calcd. for $C_{27}H_{36}O_7$: C, 68.62; H, 7.68. Found: C, 68.45; H, 7.56.

The infrared spectrum of the compound (mineral oil mull) exhibited maxima at 1785, 1748, 1725, 1260, 1245, 1140, 1078, 1030, and 1016 reciprocal centimeters.

(b) 0.283 g. of 3β,21-diacetoxy-17α,20-dihydroxy-5-pregnene-16α-acetic acid γ-lactone which after three recrystallizations from a mixture of acetone and Skellysolve B had a melting point of 200 to 204° C.

*Analysis.*—Calcd. for $C_{27}H_{38}O_7$: C, 68.33; H, 8.07. Found: C, 68.56; H, 8.02.

The infrared spectrum of the compound (mineral oil mull) exhibited maxima at 3510, 1775, 1748, 1730, 1720, 1250, 1225, 1170, 1125, 1040, and 1015 reciprocal centimeters.

In similar manner but employing the 16β-epimer of the starting material, there are obtained 3β,21-diacetoxy-17α-hydroxy-5-pregnene-20-one-16β-acetic acid and 3β,21-diacetoxy-17α,20-dihydroxy-5-pregnene-16β-acetic acid.

EXAMPLE 64

*17α - hydroxy - 6α-methyl-3,20-dioxopregna-1,4,9(11)-triene-16α-acetaldehyde γ-lactol and 17α,20-dihydroxy-6α-methyl-3-oxopregna-1,4,9(11)-triene-16α-acetic acid γ-lactone*

A solution of 2.7 g. of $\Delta^{1,4,9(11)}$-3-keto-2',6-dimethyl-6'β-methoxy-5',6'-dihydroandrostano-[17,16α-c]-pyran in 35 ml. of tetrahydrofuran was stirred at room temperature for 20 hr. with 2.7 g. of osmium tetroxide. At the end of this time, hydrogen sulfide was bubbled through the solution for 15 minutes and the resulting product was filtered. The filtrate was evaporated to dryness in vacuo and the residue was dissolved in methylene chloride and chromatographed on a column of magnesium silicate (Florisil). The column was eluted with Skellysolve B containing increasing proportions of acetone and those fractions which, on the basis of infrared and paper chromatographic analysis, were found to contain the desired products were evaporated to dryness to yield the following materials:

(a) 0.366 g. of 17α-hydroxy-6α-methyl-3,20-dioxopregna-1,4,9(11)-triene-16α-acetaldehyde γ-lactol which after 3 crystallizations from a mixture of acetone and Skellysolve B had a melting point of 239 to 242° C.

*Analysis.*—Calcd. for $C_{24}H_{30}O_4$: C, 75.36; H, 7.91. Found: C, 74.85; H, 7.53.

The ultraviolet spectrum of the compound (ethanol solution) exhibited a maximum at 239 millimicrons ($\epsilon$=15,500). The infrared spectrum of the compound (mineral oil mull) exhibited maxima at 3320, 3060, 1705, 1660, 1610, 1232, 1215, 1192, 1150, 1095, 1070, and 1020 reciprocal centimeters.

(b) 0.18 g. of 17α,20-dihydroxy-6α-methyl-3-oxopregna-1,4,9(11)-triene-16α-acetic acid γ-lactone which had an infrared spectrum consistent with the assigned structure exhibiting maxima at 3600, 1770, 1665, 1625, 1605 reciprocal centimeters.

In similar manner but employing the 16β-epimer of the starting material there are obtained 17α-hydroxy-6α-methyl - 3,20-dioxopregna-1,4,9(11)-triene-16β-acetaldehyde and 17α,20 - dihydroxy - 6α-methyl-3-oxopregna-1,4,9(11)-triene-16β-acetic acid.

Example 65

*17α - hydroxy - 6α-methyl-3,20-dioxopregna-1,4,9(11)-triene-16α-acetic acid γ-lactone*

Using the procedure described in Example 60, but replacing 17α,20 - dihydroxy-3β-acetoxy-5-pregnene-16α-acetic acid γ-lactone by 17α-hydroxy-6α-methyl-3,20-dioxopregna - 1,4,9(11) - triene-16α-acetaldehyde γ-lactol, there are obtained 17α-hydroxy-6α-methyl-3,20-dioxopregna-1,4,9(11)-triene-16α-acetic acid γ-lactone in the form of a crystalline solid having a melting point of 245 to 250° C.

*Analysis.*—Calcd. for $C_{24}H_{28}O_4$: C, 75.76; H, 7.42. Found: C, 75.58; H, 6.90.

The ultraviolet spectrum of the compound (ethanol solution) exhibited a maxima at 238.5 millimicrons ($\epsilon=15{,}650$). The infrared spectrum of the compound (mineral oil mull) exhibited maxima at 1785, 1715, 1675, 1639, 1605, 1230, 1205, 1160, 1140 and 1075 reciprocal centimeters.

In similar manner, but employing the 16β-epimer of the starting material there is obtained 17α-hydroxy-6α-methyl-3,20-dioxopregna-1,4,9(11)-triene-16β-acetic acid.

Example 66

*16α - hydroxy - 6α - methyl-3,20-dioxopregn-4-ene-16α-acetaldehyde γ-lactol and 17α,20-dihydroxy-6α-methyl-3-oxopregn-4-ene-16α-acetic acid γ-lactone*

A solution of 20 g. of Δ⁴-3-keto-6α,2'-dimethyl-6'β-methoxy-5',6'-dihydroandrostano-[17,16α-c]-pyran in 350 ml. of tetrahydrofuran was stirred with 15 g. of osmium tetroxide at room temperature for 18 hr. At the end of this time the mixture was saturated with hydrogen sulfide and filtered. The filtrate was evaporated to dryness and the residue was dissolved in methylene chloride and chromatographed on a column of magnesium silicate (Florisil). The column was eluted with Skellysolve B containing increasing proportions of acetone and those fractions which, on the basis of infrared and paper chromatographic analysis, were found to contain the desired product, were evaporated to dryness to yield the following materials:

(a) 1.44 g. of 17α-hydroxy-6α-methyl-3,20-dioxopregn-4-ene-16α-acetaldehyde γ-lactol which, after recrystallization from ether and then from a mixture of acetone and Skellysolve B, had a melting point of 177 to 179° C.

*Analysis.*—Calcd. for $C_{24}H_{34}O_4$: C, 74.57; H, 8.87. Found: C, 74.31; H, 9.49.

The ultraviolet spectrum of the compound (ethanol solution) exhibited a maximum at 241 millimicrons ($\epsilon=16{,}150$). The infrared spectrum of the compound (mineral oil mull) exhibited maxima at 3340, 1700, 1645, 1595, 1245, 1230, 1210, 1185, 1150, 1078, 1062, 1055 and 1015 reciprocal centimeters.

(b) 0.8 g. of 17α,20-dihydroxy-6α-methyl-3-oxopregn-4-ene-16α-acetic acid γ-lactone which was characterized by its infrared spectrum exhibiting maxima at 3600, 1770, 1665, 1625, reciprocal centimeters.

In similar manner but employing the 16β-epimer of the starting dihydroandrostanopyran, there are obtained 17α-hydroxy - 6α - methyl-3,20-dioxopregn-4-ene-16β-acetaldehyde and 17α,20-dihydroxy-6α-methyl-3-oxopregn-4-ene-16β-acetic acid.

Example 67

*17α-hydroxy-6α-methyl-3,20-dioxopregn-4-ene-16α-acetic acid γ-lactone*

Using the procedure described in Example 60, but replacing 17α,20-dihydroxy-3β-acetoxy-5-pregnene-16α-acetic acid γ-lactone by 17α,20-dihydroxy-6α-methyl-3-oxopregn-4-ene-16α-acetic acid γ-lactone, there was obtained 17α - hydroxy-6α-methyl-3,20-dioxopregn-4-ene-16α-acetic acid γ-lactone in the form of a crystalline solid having a melting point of 200 to 201° C. after several recrystallizations from a mixture of acetone and Skellysolve B.

*Analysis.*—Calcd. for $C_{24}H_{32}O_4$: C, 74.97; H, 8.39. Found: C, 74.38; H, 8.62.

The ultraviolet spectrum of the compound (ethanol solution) exhibited a maximum at 240 millimicrons ($\epsilon=16{,}050$). The infrared spectrum of the compound (mineral oil mull) exhibited maxima at 1788, 1712, 1672, 1625, 1241, 1209, 1159, 1080, 1069, and 1007 reciprocal centimeters.

In similar manner, 17α,20-dihydroxy-6α-methyl-3-oxopregn-4-ene-16β-acetic acid is oxidized to 17α-hydroxy-6α-methyl-3,20-dioxopregn-4-ene-16β-acetic acid.

Example 68

Using the procedure described in Example 59, but replacing Δ⁵-3β-acetoxy-2'-methyl-6'β-methoxy-5',6'-dihydroandrostano - [17,16α-c] - pyran by Δ⁴-3,11-diketo-2'-methyl - 6'β-methoxy-5',6'-dihydroandrostano-[17,16α-c]-pyran, there are obtained 17α-hydroxy-3,11,20-trioxopregn-4-ene-16α - acetic acid γ - lactone, 17α - hydroxy-3,11,20-trioxopregn-4-ene-16α-acetaldehyde γ-lactol, and 17α,20 - dihydroxy-3,11-dioxopregn-4-ene-16α-acetic acid γ-lactone.

The corresponding 16β-epimers of the above-named compounds are obtained by employing the 16β-epimer of the starting material.

Example 69

Using the procedure described in Example 59, but replacing Δ⁵ - 3β - acetoxy-2'-methyl-6'β-methoxy-5',6'-dihydroandrostano - [17,16α-c] - pyran by Δ⁴-3-keto-11α-hydroxy - 2' - methyl-6'β-methoxy-5',6'-dihydroandrostano-[17,16α-c]-pyran, there are obtained 17α,11α-dihydroxy-3,20-dioxopregn-4-ene-16α-acetic acid γ-lactone, 17α,11α-dihydroxy - 3,20 - dioxopregn - 4 - ene-16α-acetaldehyde γ-lactol, and 17α,11α,20 - trihydroxy - 3 - oxopregn-4-ene-16α-acetic acid γ-lactone.

The corresponding 16β-epimers of the above-named compounds are obtained by employing the 16β-epimer of the starting material.

Example 70

Using the procedure described in Example 59, but replacing Δ⁵-3β - acetoxy-2'-methyl-6'β-methoxy-5',6'-dihydroandrostano-[17,16α-c]-pyran by Δ⁴ - 3 - keto-11β-hydroxy - 2' - methyl-6'β-methoxy-5',6'-dihydroandrostano-[17,16α-c]-pyran, there are obtained 17α,11β-dihydroxy-3,20-dioxopregn-4-ene-16α-acetic acid γ-lactone, 17α,11β-dihydroxy-3,20-dioxopregn-4-ene - 16α - acetaldehyde γ-lactol, and 17α,11β,20-trihydroxy-3-oxopregn-4-ene-16α-acetic acid γ-lactone.

The corresponding 16β-epimers of the above-named compounds are obtained by employing the 16β-epimer of the starting material.

Example 71

Using the procedure described in Example 59, but replacing Δ⁵-3β - acetoxy-2'-methyl-6'β-methoxy-5',6'-dihydroandrostano-[17,16α-c] - pyran by Δ⁴-3-keto-11β-hydroxy - 2' - acetoxymethyl - 6'β-methoxy-5',6'-dihydroandrostano-[17,16α-c]-pyran, there are obtained 17α,11β-dihydroxy - 21 - acetoxy-3,20-dioxopregn-4-ene-16α-acetic acid γ-lactone, 17α,11β-dihydroxy-21-acetoxy-3,20-dioxopregn-4-ene-16α-acetaldehyde γ-lactol, and 17α,11β,20-trihydroxy - 21 - acetoxy-3-oxopregn-4-ene-16α-acetic acid γ-lactone.

The corresponding 16β-epimers of the above-named compounds are obtained by employing the 16β-epimer of the starting material.

EXAMPLE 72

Using the procedure described in Example 59, but replacing Δ$^5$-3β - acetoxy-2'-methyl-6'β-methoxy-5',6'-dihydroandrostano-[17,16α-c]-pyran by Δ$^4$-3,11 - diketo - 2'-acetoxymethyl - 6'β - methoxy - 5',6'-dihydroandrostano-[17,16α-c]-pyran, there are obtained 17α-hydroxy-21-acetoxy-3,11,20-trioxopregn - 4 - ene-16α-acetic acid γ-lactone, 17α-hydroxy-21-acetoxy-3,11,20 - trioxopregn-4-ene-16α-acetaldehyde γ-lactol, and 17α,20-dihydroxy-21-acetoxy-3,11-dioxopregn-4-ene-16α-acetic acid γ-lactone.

The corresponding 16β-epimers of the above-named compounds are obtained by employing the 16β-epimer of the starting material.

EXAMPLE 73

Using the procedure described in Example 59, but replacing Δ$^5$-3β - acetoxy-2'-methyl-6'β-methoxy-5',6'-dihydroandrostano-[17,16α-c]-pyran by Δ$^4$-3-keto - 2'-acetoxymethyl - 6'β - methoxy-5',6'-dihydroandrostano-[17,16α-c]-pyran, there are obtained 17α-hydroxy-3,20-dioxopregn-4-ene - 16α - acetic acid γ-lactone, 17α-hydroxy-3,20-dioxopregn-4-ene-16α-acetaldehyde γ-lactone, and 17α,20-dihydroxy-3-oxopregn-4-ene-16α-acetic acid γ-lactone.

The corresponding 16β-epimers of the above-named compounds are obtained by employing the 16β-epimer of the starting material.

EXAMPLE 74

Using the procedure described in Example 59, but replacing Δ$^5$-3β - acetoxy-2'-methyl-6'β-methoxy-5',6'-dihydroandrostano-[17,16α-c]-pyran by Δ$^4$-3,11-diketo - 6α-methyl - 2' - acetoxymethyl - 6'β-methoxy-5',6'-dihydroandrostano-[17,16α-c]-pyran, there are obtained 6α-methyl-17α-hydroxy - 3,11,20 - trioxopregn-4-ene-16α-acetic acid γ-lactone, 6α-methyl-17α - hydroxy-3,11,20-trioxopregn-4-ene-16α-acetaldehyde γ-lactol, and 6α-methyl-17α,20-dihydroxy - 3,11 - dioxopregn-4-ene-16α-acetic acid γ-lactone.

The corresponding 16β-epimers of the above-named compounds are obtained by employing the 16β-epimer of the starting material.

EXAMPLE 75

Using the procedure described in Example 59, but replacing Δ$^5$-3β - acetoxy-2'-methyl-6'β-methoxy-5',6'-dihydroandrostano[17,16α-c]-pyran by Δ$^4$-3 - keto - 11β-hydroxy-6α-methyl-2'-acetoxymethyl-6'β-methoxy-5',6'-dihydroandrostano-[17,16α-c]-pyran, there are obtained 6α-methyl - 11β,17α - dihydroxy-21-acetoxy-3,20-dioxopregn-4-ene - 16α - acetic acid γ-lactone, 6α-methyl-11β,17α-dihydroxy-21-acetoxy-3,20-dioxopregn-4-ene-16α-acetaldehyde γ-lactol, and 6α-methyl-11β,17α,20-trihydroxy-21-acetoxy-3-oxopregn-4-ene-16α-acetic acid γ-lactone.

The corresponding 16β-epimers of the above-named compounds are obtained by employing the 16β-epimer of the starting material.

EXAMPLE 76

Using the procedure described in Example 59, but replacing Δ$^5$-3β - acetoxy-2'-methyl-6'β-methoxy-5'6'-dihydroandrostano-[17,16α-c]-pyran by Δ$^{4,9(11)}$-3-keto - 6α-methyl-2' - acetoxymethyl - 6'β - methoxy-5',6'-dihydroandrostano-[17,16α-c]-pyran, there are obtained 6α-methyl-17α - hydroxy - 21 - acetoxy-3,20-dioxopregna-4,9(11)-diene-16α-acetic acid γ-lactone, 6α-methyl-17α-hydroxy-21-acetoxy-3,20 - dioxopregna - 4,9(11)-diene-16α-acetaldehyde γ-lactol, and 6α-methyl-17α,20-dihydroxy-21-acetoxy-3-oxopregna-4,9(11)-diene-16α-acetic acid γ-lactone.

The corresponding 16β-epimers of the above-named compounds are obtained by employing the 16β-epimer of the starting material.

EXAMPLE 77

Using the procedure described in Example 59, but replacing Δ$^5$ - 3β-acetoxy-2'-methyl-6'β-methoxy-5',6'-dihydroandrostano-[17,16α-c]-pyran by Δ$^{1,4}$-3-keto-6α,2'-dimethyl - 6'β-methoxy-5',6'-dihydroandrostano-[17,16α-c]-pyran, there are obtained 6α-methyl-17α-hydroxy-3,20-dioxopregna-1,4-diene-16α-acetic acid γ-lactone, 6α-methyl-17α - hydroxy - 3,20 - dioxopregna-1,4-diene-16α-acetaldehyde γ-lactol, and 6α-methyl-17α,20-dihydroxy-3-oxopregna-1,4-diene-16α-acetic acid γ-lactone.

The corresponding 16β-epimers of the above named compounds are obtained by employing the 16β-epimer of the starting material.

EXAMPLE 78

Using the procedure described in Example 59, but replacing Δ$^5$ - 3β-acetoxy-2'-methyl-6'β-methoxy-5',6'-dihydroandrostano-[17,16α-c]-pyran by Δ$^{1,4}$-3-keto-11β-hydroxy - 2' - methyl-6'β-methoxy-5',6'-dihydroandrostano-[17,16α-c]-pyran, there are obtained 11β,17α-dihydroxy-3,20-dioxopregna-1,4-diene-16α-acetic acid γ-lactone, 11β, 17α - dihydroxy - 3,20-dioxopregna-1,4-diene-16α-acetaldehyde γ-lactol, and 11β,17α,20-trihydroxy-3-oxopregna-1,4-diene-16α-acetic acid γ-lactone.

The corresponding 16β-epimers of the above-named compounds are obtained by employing the 16β-epimer of the starting material.

EXAMPLE 79

Using the procedure described in Example 59, but replacing Δ$^5$ - 3β-acetoxy-2'-methyl-6'β-methoxy-5',6'-dihydroandrostano-[17,16α-c]-pyran by Δ$^{1,4}$-3,11-diketo-6α-methyl - 2' - acetoxymethyl - 6'β - methoxy-5',6'-dihydroandrostano-[17,16α-c]-pyran, there are obtained 6α-methyl - 17α - hydroxy-21-acetoxy-3,11-20-trioxopregna-1,4-diene-16α-acetic acid γ-lactone, 6α-methyl-17α-hydroxy-21-acetoxy - 3,11,20-trioxopregna-1,4-diene-16α-acetaldehyde γ-lactol, and 6α-methyl-17α,20-dihydroxy-21-acetoxy-3,11-dioxopregna-1,4-diene-16α-acetic acid γ-lactone.

The corresponding 16β-epimers of the above-named compounds are obtained by employing the 16β-isomer of the starting material.

EXAMPLE 80

Using the procedure described in Example 59, but replacing Δ$^5$ - 3β-acetoxy-2'-methyl-6'β-methoxy-5',6'-dihydroandrostano-[17,16α-c]-pyran by Δ$^{1,4}$-11β-hydroxy-6α-methyl - 2'-acetoxymethyl-6'β-methoxy-5'6'-dihydroandrostano-[17,16α-c]-pyran, there are obtained 6α-methyl-11β, 17α - dihydroxy - 21-acetoxy-3,20-dioxopregna-1,4-diene-16α-acetic acid γ-lactone, 6α-methyl-11β,17α-dihydroxy-21 - acetoxy-3,20-dioxopregna-1,4-diene-16α-acetaldehyde γ-lactol, and 6α-methyl-11β,17α,20-trihydroxy-21-acetoxy-3-oxopregna-1,4-diene-16α-acetic acid γ-lactone.

The corresponding 16β-epimers of the above-named compounds are obtained by employing the 16β-epimer of the starting material.

EXAMPLE 81

Using the procedure described in Example 59, but replacing Δ$^5$ - 3β-acetoxy-2'-methyl-6'β-methoxy-5',6'-dihydroandrostano - [17,16α-c]-pyran by Δ$^{1,4,9(11)}$-3-keto-6α-methyl - 2' - acetoxymethyl-6'β-methoxy-5',6'-dihydroandrostano-[17,16α-c]-pyran, there are obtained 6α-methyl-17α - hydroxy-21-acetoxy-3,20-dioxopregna-1,4,9(11)-triene-6α-acetic acid γ-lactone, 6α-methyl-17α-hydroxy-21-acetoxy - 3,20-dioxopregna-1,4,9(11)-triene-16α-acetaldehyde γ-lactol, and 6α-methyl-17α,20-dihydroxy-21-acetoxy-3-oxopregna-1,4,9(11)-triene-16α-acetic acid γ-lactone.

The corresponding 16β-epimers of the above-named compounds are obtained by employing the 16β-epimer of the starting material.

Example 82

Using the procedure described in Example 59, but replacing $\Delta^5$ - 3β-acetoxy-2'-methyl-6'β-methoxy-5',6'-dihydroandrostano - [17,16α-c]-pyran by $\Delta^{1,4}$-3,11-diketo-2'-methyl - 6'β-methoxy-5',6'-dihydroandrostano-[17,16α-c]-pyran, there are obtained 17α-hydroxy-3,11,20-trioxopregna-1,4-diene-16α-acetic acid γ-lactone, 17α-hydroxy-3,11,20-trioxopregna-1,4-diene-16α-acetaldehyde γ-lactol, and 17α,20 - dihydroxy-2,11-dioxopregna-1,4-diene-16α-acetic acid γ-lactone.

The corresponding 16β-epimers of the above-named compounds are obtained by employing the 16β-epimers of the starting material.

Example 83

Using the procedure described in Example 59, but replacing $\Delta^5$ - 3β-acetoxy-2'-methyl-6'β-methoxy-5',6'-dihydroandrostano-[17,16α-c]-pyran by $\Delta^{1,4}$-3-keto-11α-hydroxy - 2' - methyl-6'β-methoxy-5',6'-dihydroandrostano-[17,16α-c]-pyran, there are obtained 11α,17α-dihydroxy-3,20-dioxopregna-1,4-diene-16α-acetic acid γ-lactone, 11α,17α - dihydroxy-3,20-dioxopregna-1,4-diene-16α-acetaldehyde γ - lactol, 11α,17α,20-trihydroxy-3-oxopregna-1,4-diene-16α-acetic acid γ-lactone.

The corresponding 16β-epimers of the above-named compounds are obtained by employing the 16β-epimer of the starting material.

Example 84

Using the procedure described in Example 59, but replacing $\Delta^5$ - 3β - acetoxy - 2' - methyl - 6'β - methoxy-5',6' - dihydroandrostano - [17,16α-c] - pyran by $\Delta^{1,4}$-3 - keto - 11β - hydroxy - 2' - acetoxymethyl - 6'β-methoxy - 5',6' - dihydroandrostano - [17,16α-c] - pyran, there are obtained 11β,17α-dihydroxy-21-acetoxy-3,20-dioxopregna-1,4-diene-16α-acetic acid γ-lactone, 11β,17α-dihydroxy - 21 - acetoxy - 3,20 - dioxopregna - 1,4-diene-16α-acetaldehyde γ-lactol, and 11β,17α,20-trihydroxy - 21 - acetoxy - 3 - oxopregna - 1,4 - diene - 16α-acetic acid γ-lactone.

The corresponding 16β-epimers of the above-named compounds are obtained by employing the 16β-epimer of the starting material.

Example 85

Using the procedure described in Example 59, but replacing $\Delta^5$ - 3β - acetoxy - 2' - methyl - 6'β - methoxy-5',6' - dihydroandrostano - [17,16α-c] - pyran by $\Delta^{1,4}$-3,11 - diketo - 2' - acetoxymethyl - 6'β - methoxy - 5',6'-dihydroandrostano-[17,16α-c]-pyran, there are obtained 17α - hydroxy - 21 - acetoxy - 3,11,20 - trioxopregna-1,4-diene-16α-acetic acid γ-lactone, 17α-hydroxy-21-acetoxy - 3,11,20 - trioxopregna - 1,4 - diene - 16α - acetaldehyde γ-lactol, and 17α,20-dihydroxy-21-acetoxy-3,11-dioxopregna-1,4-diene-16α-acetic acid γ-lactone.

The corresponding 16β-epimers of the above-named compounds are obtained by employing the 16β-epimer of the starting material.

Example 86

Using the procedure described in Example 59, but replacing $\Delta^5$ - 3β - acetoxy - 2' - methyl - 6'β - methoxy-5',6' - dihydroandrostano - [17,16α-c] - pyran by $\Delta^{1,4}$-3 - keto - 2' - acetoxymethyl - 6'β - methoxy - 5',6' - dihydroandrostano-[17,16α-c]-pyran, there are obtained 17α - hydroxy - 21 - acetoxy - 3,20 - dioxopregna - 1,4-diene-16α-acetic acid γ-lactone, 17α-hydroxy-21-acetoxy-3,20 - dioxopregna - 1,4 - diene - 16α - acetaldehyde γ-lactol, and 17α,20-dihydroxy-21-acetoxy-3-oxopregna-1,4-diene-16α-acetic acid γ-lactone.

The corresponding 16β-epimers of the above-named compounds are obtained by employing the 16β-epimer of the starting material.

Example 87

Using the procedure described in Example 59, but replacing $\Delta^5$ - 3β - acetoxy - 2' - methyl - 6'β - methoxy - 5',6'-dihydroandrostano-[17,16α-c]-pyran by $\Delta^5$-3β-acetoxy-2',6 - dimethyl - 6'β - methoxy - 5',6' - dihydroandrostano-[17,16α-c]-pyran, there are obtained 3β-acetoxy-6-methyl - 17α - hydroxy - 20 - oxopregn - 5 - ene - 16α-acetic acid γ-lactone, 3β-acetoxy-6-methyl-17α-hydroxy-20 - oxopregn - 5 - ene - 16α - acetaldehyde γ-lactol, and 3β - acetoxy - 6 - methyl - 17α,20 - dihydroxypregn - 5-ene-16α-acetic acid γ-lactone.

The corresponding 16β-epimers of the above-named compounds are obtained by employing the 16β-epimer of the starting material.

Example 88

Using the procedure described in Example 59, but replacing $\Delta^5$ - 3β - acetoxy - 2' - methyl - 6'β - methoxy-5',6'-dihydroandrostano-[17,16α-c]-pyran by 3β-acetoxy-11 - keto - 2' - acetoxymethyl - 6'β - methoxy - 5',6' - dihydro-5α-androstano-[17,16α-c]-pyran, there are obtained 17α - hydroxy - 3β,21 - diacetoxy - 11,20 - dioxo - 5α-pregnane-16α-acetic acid γ-lactone, 17α-hydroxy-3β,21-diacetoxy - 11,20 - dioxo - 5α - pregnane - 16α - acetaldehyde γ-lactol, and 17α,20-dihydroxy-3β,21-diacetoxy-11-oxo-5α-pregnane-16α-acetic acid γ-lactone.

The corresponding 16β-epimers of the above-named compounds are obtained by employing the 16β-epimer of the starting material.

Example 89

Using the procedure described in Example 59, but replacing $\Delta^5$ - 3β - acetoxy - 2' - methyl - 6'β - methoxy-5',6'-dihydroandrostano-[17,16α-c]-pyran by 3β-acetoxy-11β - hydroxy - 2' - acetoxymethyl - 6'β - methoxy - 5',6'-dihydro-5α-androstano-[17,16α-c]-pyran, there are obtained 11β,17α - dihydroxy - 3β,21 - diacetoxy - 20 - oxo-5α-pregnane-16α-acetic acid γ-lactone, 11β,17α-dihydroxy - 3β,21 - diacetoxy - 20 - oxo - 5α - pregnane - 16α-acetaldehyde γ-lactone, and 11β,17α,20-trihydroxy-3β,21-diacetoxy-5α - pregnane-16α-acetic acid γ-lactone.

The corresponding 16β-epimers of the above-named compounds are obtained by employing the 16β-epimer of the starting material.

Example 90

Using the procedure described in Example 59, but replacing $\Delta^5$ - 3β - acetoxy - 2' - methyl - 6'β - methoxy-5',6'-dihydroandrostano-[17,16α-c]-pyran by 3β-acetoxy-2' - methyl - 6'β - methoxy - 5',6' - dihydroandrostano-[17,16α-c]-pyran, there are obtained 17α-hydroxy-3β-acetoxy-20-oxo-5β-pregnane-16α-acetic acid γ-lactone, 17α - hydroxy - 3β - acetoxy - 20 - oxo - 5β - pregnane-16α-acetaldehyde γ-lactol, and 17α,20-dihydroxy-3β-acetoxy-5β-pregnane-16α-acetic acid γ-lactone.

The corresponding 16β-epimers of the above-named compounds are obtained by employing the 16β-epimer of the starting material.

Example 91

Using the procedure described in Example 59, but replacing $\Delta^5$-3β-acetoxy - 2' - methyl-6'β - methoxy-5',6'-dihydroandrostano-[17,16α - c] - pyran by 3α-acetoxy-11-keto-2'-methyl - 6'β-methoxy - 5',6' - dihydroandrostano-[17,16α-c]-pyran, there are obtained 17α-hydroxy-3α-acetoxy-11,20-dioxopregnane-16α-acetic acid γ-lactone, 17α-hydroxy-3α-acetoxy - 11,20 - dioxopregnane-16α-acetaldehyde γ-lactol, and 17α,20-dihydroxy-3α-acetoxy-11-oxopregnane-16α-acetic acid γ-lactone.

The corresponding 16β-epimers of the above-named compounds are obtained by employing the 16β-epimer of the starting material.

Example 92

Using the procedure described in Example 59, but replacing $\Delta^5$-3β-acetoxy - 2' - methyl-6'β - methoxy-5',6'- dihydroandrostano - [17,16α-c] - pyran by 3α - acetoxy-11β-hydroxy-2'-methyl-6'-β-methoxy - 5',6' - dihydroandrostano - [17,16α-c]-pyran, there are obtained 11β,17α-dihydroxy-3α-acetoxy-20-oxopregnane-16α-acetic acid γ-lactone, 11β,17α-dihydroxy-3α-acetoxy-20 - oxopregnane-16α-acetaldehyde γ-lactol, and 11β,17α,20-trihydroxy-3α-acetoxypregnane-16α-acetic acid γ-lactone.

The corresponding 16β-epimers of the above-named compounds are obtained by employing the 16β-epimer of the starting material.

EXAMPLE 93

Using the procedure described in Example 59, but replacing Δ$^5$-3β-acetoxy - 2' - methyl-6'β - methoxy-5',6'-dihydroandrostano - [17,16α-c] - pyran by 3β - acetoxy-2'-methyl-6'β-methoxy-5',6' - dihydro - 5α - androstano-[17,16α-c]-pyran, there are obtained 17α-hydroxy-3β-acetoxy-20-oxo-5α - pregnane - 16α-acetic acid γ-lactone, 17α-hydroxy-3β-acetoxy-20-oxo-5α - pregnane-16α-acetaldehyde γ-lactol, and 17α,20-dihydroxy-3β-acetoxy-5α-pregnane-16α-acetic acid γ-lactone.

The corresponding 16β-epimers of the above-named compounds are obtained by employing the 16β-epimer of the starting material.

EXAMPLE 94

Using the procedure described in Example 59, but replacing Δ$^5$-3β-acetoxy - 2' - methyl-6'β - methoxy-5',6'-dihydroandrostano - [17,16α-c] - pyran by 3α - acetoxy-2'-methyl-6'β-methoxy-5',6' - dihydroandrostano-[17,16α-c]-pyran, there are obtained 17α-hydroxy-3α-acetoxy-20-oxopregnane-16α-acetic acid γ-lactone, 17α-hydroxy-3α-acetoxy-20-oxopregnane-16α-acetaldehyde γ-lactol, and 17α,20-dihydroxy-3α-acetoxypregnane-16α-acetic acid.

The corresponding 16β-epimers of the above-named compounds are obtained by employing the 16β-epimer of the starting material.

EXAMPLE 95

Using the procedure described in Example 59, but replacing Δ$^5$-3β-acetoxy - 2' - methyl-6'β - methoxy-5',6'-dihydroandrostano-[17,16α-c]-pyran by Δ$^5$-3β-acetoxy-2'-methyl-6'β-ethoxy-5',6'-dihydroandrostano-[17,16α-c]-pyran, there are obtained 17α-hydroxy-3β - acetoxy-20-oxopregn-5-ene-16α-acetic acid γ-lactone, 17α-hydroxy-3β-acetoxy-20-oxopregn-5-ene-16α - acetaldehyde γ-lactol, and 17α,20-dihydroxy-3β-acetoxypregn - 5 - ene-16α-acetic acid γ-lactone.

The corresponding 16β-epimers of the above-named compounds are obtained by employing the 16β-epimer of the starting material.

EXAMPLE 96

Using the procedure described in Example 59, but replacing Δ$^5$-3β-acetoxy - 2' - methyl-6'β - methoxy-5',6'-dihydroandrostano-[17,16α-c]-pyran by Δ$^5$-3β-acetoxy-11-keto-2'-methyl-6'β-methoxy - 5'6' - dihydroandrostano-[17,16α-c]-pyran, there are obtained 17α-hydroxy-3β-acetoxy-11,20-dioxopregn-5-ene-16α-acetic acid γ-lactone, 17α-hydroxy-3β-acetoxy-11,20-dioxopregn-5-ene-16α-acetaldehyde γ-lactol, and 17α,20-dihydroxy-3β-acetoxy-11-oxopregn-5-ene-16α-acetic acid γ-lactone.

The corresponding 16β-epimers of the above-named compounds are obtained by employing the 16β-epimer of the starting material.

EXAMPLE 97

Using the procedure described in Example 59, but replacing Δ$^5$-3β-acetoxy - 2' - methyl-6'β - methoxy-5',6'-dihydroandrostano-[17,16α-c]-pyran by Δ$^5$-3β-acetoxy-11β-hydroxy-2'-methyl - 6'β - methoxy-5',6'-dihydroandrostano-[17,16α-c]-pyran there are obtained 11β,17α-dihydroxy-3β-acetoxy-20-oxopregn-5-ene-16α-acetic acid γ-lactone, 11β,17α-dihydroxy-3β-acetoxy - 20 - oxopregn-5-ene-16α-acetaldehyde γ-lactol, and 11β,17α,20-trihydroxy-3β-acetoxypregn-5-ene-16α-acetic acid γ-lactone.

EXAMPLE 98

Using the procedure described in Example 59, but replacing Δ$^5$-3β-acetoxy - 2' - methyl-6'β - methoxy-5',6'-dihydroandrostano-[17,16α-c]-pyran by Δ$^5$-3β-acetoxy-6-methyl-11-keto-2'-methyl - 6'β - methoxy-5',6'-dihydroandrostano-[17,16α-c]-pyran, there are obtained 17α-hydroxy-3β-acetoxy-6-methyl-11,20 - dioxopregn-5-ene-16α-acetic acid γ-lactone, 17α-hydroxy-3β-acetoxy-6-methyl-11,20-dioxopregn-5-ene-16α-acetaldehyde γ-lactol, and 17α,20-dihydroxy-3β-acetoxy - 6 - methyl-11-oxopregn-5-ene-16α-acetic acid γ-lactone.

The corresponding 16β-epimers of the above-named compounds are obtained by employing the 16β-epimer of the starting material.

EXAMPLE 99

Using the procedure described in Example 59, but replacing Δ$^5$ - 3β-acetoxy-2'-methyl-6'β-methoxy-5',6'-dihydroandrostano-[17,16α-c]-pyran by Δ$^5$-3β-acetoxy-6-methyl - 11β - hydroxy-2'-methyl-6'β-methoxy-5',6'-dihydroandrostano-[17,16α-c]-pyran, there are obtained 11β,17α - dihydroxy-3β-acetoxy-6-methyl-20-oxopregn-5-ene-16α-acetic acid γ-lactone, 11β,17α-dihydroxy-3β-acetoxy-6-methyl-20-oxopregn-5-ene - 16α - acetaldehyde γ-lactol, and 11β,17α,20 - trihydroxy-3β-acetoxy-6-methylpregn-5-ene-16α-acetic acid γ-lactone.

The corresponding 16β-epimers of the above-named compounds are obtained by employing the 16β-epimer of the starting material.

EXAMPLE 100

Using the procedure described in Example 59, but replacing Δ$^5$ - 3β-acetoxy-2'-methyl-6'β-methoxy-5',6'-dihydroandrostano-[17,16α-c]-pyran by Δ$^5$ - 3β-acetoxy-6-methyl - 11β - hydroxy - 2' - acetoxymethyl-6'β-methoxy-5',6'-dihydroandrostano-[17,16α-c]-pyran, there are obtained 11β,17α - dihydroxy-3β,21-diacetoxy-6-methyl-20-oxopregn-5-ene-16α-acetic acid γ-lactone, 11β,17α-dihydroxy - 3β,21-diacetoxy-6-methyl-20-oxopregn-5-ene-16α-acetaldehyde γ-lactol, and 11β,17α,20-trihydroxy-3β,21-diacetoxy-6-methylpregn-5-ene-16α-acetic acid γ-lactone.

The corresponding 16β-epimers of the above-named compounds are obtained by employing the 16β-epimer of the starting material.

EXAMPLE 101

*17α-hydroxy-3β-propionyloxy-20-oxopregn-5-ene-16α-acetic acid γ-lactone*

Using the procedure described in Example 56, but replacing Δ$^5$ - 3β-hydroxy-2'-methyl-6'β-methoxy-5',6'-dihydroandrostano-[17,16α-c]-pyran by 3β,17α-dihydroxy-20-oxopregn-5-ene-16α-acetic acid γ-lactone, there is obtained 17α - hydroxy-3β-propionyloxy-20-oxopregn-5-ene-16α-acetic acid γ-lactone.

Similarly by reacting 3β,17α-dihydroxy-20-oxopregn-5-ene-16α-acetic acid γ-lactone with the appropriate acid anhydride under the conditions described in Example 56, there are obtained other 3-acylates of 3β,17α-dihydroxy-20-oxopregn-5-ene-16α-acetic acid γ-lactone such as the 3-isobutyrate, 3-hexanoate, 3-phenylacetate, 3β-phenylpropionate, 3-hemisuccinate, 3 - cyclopentylpropionate, 3-benzoate, 3-trimethylacetate, and the like.

Similarly by hydrolyzing, under the conditions described in Example 61, any of the 3- and/or 21-acylates described in Examples 63, 71 to 76, 79, 80, 81 and 84 to 100, and acylating the resulting free alcohols using the appropriate acid anhydride under the conditions described in Example 56, there can be obtained the corresponding 3- and/or 21-acylates in which the acyl group is that of a hydrocarbon carboxylic acid containing from 1 to 12 carbon atoms, inclusive.

EXAMPLE 102

Using the procedure described in Example 4, but replacing methyl vinyl ether by 1,1-dimethoxyethylene, there are obtained Δ⁴-3-keto-2',6α-dimethyl-6',6'-dimethoxy-5',6'-dihydroandrostano-[17,16α-c]-pyran and Δ⁴-3-keto - 2',6α-dimethyl-6',6'-dimethoxy-5',6'-dihydroandrostano-[17,16β-c]-pyran.

EXAMPLE 103

Using the procedure described in Example 4, but replacing methyl vinyl ether by ethyl acetylene monocarboxylate, there are obtained Δ⁴-3-keto-2',6α-dimethyl-6'-carbethoxyandrostano-[17,16α-c]-pyran and Δ⁴-3-keto-2',6α - dimethyl - 6' - carbethoxyandrostano - [17,16β-c]-pyran.

EXAMPLE 104

Using the procedure described in Example 4, but replacing methyl vinyl ether by diethyl acetylenedicarboxylate, there are obtained Δ⁴-3-keto-2',6α-dimethyl-5',6'-dicarbethoxyandrostano-[17,16α-c]-pyran and Δ⁴-3-keto-2',6α - dimethyl-5',6'-dicarbethoxyandrostano-[17,16β-c]-pyran.

EXAMPLE 105

Using the procedure described in Example 4, but replacing 6α-methyl-16-dehydroprogesterone by 9α-fluoropregna-4,16-diene-11β,21-diol-3,20-dione 21-acetate, there are obtained Δ⁴-9α-fluoro-3-keto-11β-hydroxy-2'-acetoxymethyl - 6'β-methoxy-5',6'-dihydroandrostano - [17,16α-c] - pyran, Δ⁴ - 9α - fluoro-3-keto-11β-hydroxy-2'-acetoxymethyl-6'β-methoxy-5',6'-dihydroandrostano - [17,16β-c]-pyran, Δ⁴ - 9α-fluoro-3-keto-11β-hydroxy-2'-acetoxymethyl - 6'α - methoxy - 5',6' - dihydroandrostano-[17,16β-c]-pyran, and Δ⁴ - 9α-fluoro-3-keto-11β-hydroxy-2'-acetoxymethyl - 6'α-methoxy-5',6'-dihydroandrostano-[17,16α-c]-pyran.

EXAMPLE 106

Using the procedure described in Example 4, but replacing 6α-methyl - 16 - dehydroprogesterone by 9α-fluoropregna-4,16-diene-21-ol-3,11,20-trione 21-acetate, there are obtained Δ⁴-9α-fluoro-3,11-diketo-2'-acetoxymethyl-6'β - methoxy-5',6'-dihydroandrostano-[17,16α-c]-pyran, Δ⁴-9α-fluoro-3,11-diketo-2'-acetoxymethyl-6'β - methoxy-5',6' - dihydroandrostano-[17,16β-c]-pyran, Δ⁴-9α-fluoro-3,11-diketo-2'-acetoxymethyl-6'α-methoxy-5',6' - dihydroandrostano - [17,16β-c] - pyran, and Δ⁴-9α-fluoro-3,11-diketo - 2' - acetoxymethyl - 6'α - methoxy-5',6'-dihydroandrostano-[17,16α-c]-pyran.

EXAMPLE 107

Using the procedure described in Example 4, but replacing 6α-methyl-16-dehydroprogesterone by 9α-fluoropregna-1,4,16-triene-21-ol-3,11,20-trione 21-acetate, there are obtained Δ¹,⁴-9α - fluoro-3,11-diketo-2'-acetoxymethyl-6'β-methoxy-5',6'-dihydroandrostano-[17,16α-c]-pyran, Δ¹,⁴-9α-fluoro-3,11-diketo-2'-acetoxymethyl-6'β-methoxy-5',6'-dihydroandrostano-[17,16β-c]-pyran, Δ¹,⁴-9α-fluoro-3,11-diketo-2'-acetoxymethyl-6'α-methoxy-5',6' - dihydroandrostano-[17,16β-c]-pyran, and Δ¹,⁴-9α-fluoro-3,11-diketo-2'-acetoxymethyl - 6'α - methoxy-5',6'-dihydroandrostano-[17,16α-c]-pyran.

EXAMPLE 108

Using the procedure described in Example 4, but replacing 6α-methyl-16-dehydroprogesterone by 9α-fluoropregna-1,4,16-triene-11β,21-diol 21-acetate, there are obtained Δ¹,⁴-9α-fluoro-3-keto-11β-hydroxy-2'-acetoxymethyl-6'β-methoxy - 5',6' - dihydroandrostano - [17,16α-c]-pyran, Δ¹,⁴-9α-fluoro-3-keto-11β-hydroxy-2'-acetoxymethyl-6'β-methoxy-5',6'-dihydroandrostano-[17,16β-c]-pyran, Δ¹,⁴-9α-fluoro-3-keto-11β-hydroxy-2'-acetoxymethyl - 6'α-methoxy-5',6'-dihydroandrostano - [17,16β-c]-pyran, and Δ¹,⁴-9α-fluoro-3-keto-11β-hydroxy - 2'-acetoxymethyl-6'α-methoxy-5',6'-dihydroandrostano-[17,16α-c]-pyran.

EXAMPLE 109

Using the procedure described in Example 4, but replacing 6α-methyl-16-dehydroprogesterone by 9α-fluoropregna-4,16-diene-3,11,20-trione, there are obtained Δ⁴-9α-fluoro - 3,11-diketo-2'-methyl-6'β-methoxy-5',6'-dihydroandrostano-[17,16α-c]-pyran, Δ⁴-9α-fluoro-3,11-diketo-2'-methyl-6'β-methoxy-5',6'-dihydroandrostano - [17,16β-c]-pyran, Δ⁴-9α-fluoro - 3,11-diketo-2'-methyl-6'α-methoxy-5',6' - dihydroandrostano-[17,16β-c]-pyran, and Δ⁴-9α-fluoro-3,11-diketo-2'-methyl-6'α-methoxy - 5',6'-dihydroandrostano-[17,16α-c]-pyran.

EXAMPLE 110

Using the procedure described in Example 4, but replacing 6α-methyl-16-dehydroprogesterone by 9α-fluoropregna-1,4,16-triene-3,11,20-trione, there are obtained Δ¹,⁴-9α-fluoro - 3,11 - diketo-2'-methyl-6'β-methoxy-5',6'-dihydroandrostano-[17,16α-c]-pyran, Δ¹,⁴-9α-fluoro-3,11-diketo-2'-methyl-6'β-methoxy-5',6' - dihydroandrostano-[17,16β-c] - pyran, Δ¹,⁴-9α-fluoro-3,11-diketo-2'-methyl-6'α-methoxy-5',6'-dihydroandrostano-[17,16β-c] - pyran, and Δ¹,⁴-9α - fluoro - 3,11-diketo-2'-methyl-6'α-methoxy-5',6'-dihydroandrostano-[17,16α-c]-pyran.

EXAMPLE 111

*17α-hydroxy-6α-methyl-9β,11β-oxido-3,20-dioxo-1,4-pregnadien-16α-acetic acid γ-lactone*

To a stirred solution of 0.61 g. of 17α-hydroxy-6α-methyl-3,20-dioxopregna-1,4,9(11)-triene-16α-acetic acid γ-lactone (prepared as described in Example 65) in 27 ml. of t.-butyl alcohol and 15 ml. of methylene chloride was added a solution of 0.33 g. of N-bromoacetamide in 6 ml. of t.-butyl alcohol and a solution of 1.7 ml. of 70 percent perchloric acid in 9 ml. of water. This mixture was stirred for a short period at approximately 25° C. before a solution of 0.5 g. of sodium sulfite in 10 ml. of water was added. The resulting mixture was distilled under reduced pressure to remove the solvent and the solid which separated was isolated by filtration, washed with water and dried in vacuo. The crude bromohydrin (0.6 g.; M.P. 199 to 201° C.) so obtained was heated under reflux with a mixture of 50 ml. of acetone and 0.6 g. of potassium acetate for 18 hrs. before being filtered. The filtrate was evaporated to dryness in vacuo and the residue was dissolved in methylene chloride and chromatographed on a column of magnesium silicate (Florisil). The column was eluted with Skellysolve B containing increasing proportions of acetone and those fractions which were found by infrared analysis to contain the desired 9β,11β-epoxide, were combined and evaporated to dryness. The residue was recrystallized from a mixture of Skellysolve B and acetone. There was thus obtained 0.36 g. of 17α-hydroxy-6α-methyl-9β,11β-oxido-3,20-dioxo - 1,4-pregnadiene-16α-acetic acid γ-lactone in the form of a crystalline solid having a melting point of 253 to 256° C.

*Analysis.*—Calcd. for $C_{24}H_{28}O_5$: C, 72.70; H, 7.12. Found: C, 72.34; H, 7.35.

The infrared spectrum of the compound (mineral oil mull) exhibited maxima at 3070, 1780, 1715, 1670, 1635, 1623, 1610, 1235, 1209, 1179, 1156, 1135, 1035 reciprocal centimeters.

Using the above procedure, but replacing 17α-hydroxy-6α-methyl-3,20-dioxopregna-1,4,9(11)-triene - 16α-acetic acid γ-lactone by 6α-methyl-17α-hydroxy-21-acetoxy-3,20-dioxopregna-1,4,9(11)-triene-16α-acetic acid γ-lactone, there is obtained 6α-methyl-17α-hydroxy-21-acetoxy-9β,11β - oxido-3,20-dioxo-1,4-pregnadiene-16α-acetic acid γ-lactone.

EXAMPLE 112

*9α-fluoro-11β,17α-dihydroxy-6α-methyl-3,20-dioxo-1,4-pregnadiene-16α-acetic acid γ-lactone*

A solution of 0.65 g. of 17α-hydroxy-6α-methyl-9β,11β-oxido-3,20-dioxo-1,4-pregnadiene-16α-acetic acid γ-lactone in 10 ml. of methylene chloride was added to a cooled mixture of 5.6 g. of hydrogen fluoride and 9.9 g. of tetrahydrofuran. The resulting mixture was allowed to stand for 18 hrs. at 0° to 5° C. and was then poured into a mixture of ice and sodium carbonate solution.

The mixture so obtained was extracted with methylene chloride and the methylene chloride extracts were washed with water, dried over anhydrous sodium sulfate, and evaporated to dryness. The residue was recrystallized from a mixture of acetone and Skellysolve B. There was thus obtained 0.44 g. of 9α-fluoro-11β,17α-dihydroxy-6α-methyl-3,20-dioxo-1,4-pregnadiene-16α-acetic acid γ-lactone in the form of a crystalline solid having a melting point of 300 to 301° C. An analytical sample having a melting point of 308 to 310° C. was obtained by further recrystallization from acetone and Skellysolve B mixture.

*Analysis.*—Calcd. for $C_{24}H_{29}O_5F$: C, 69.23; H, 6.97; F, 4.57. Found: C, 69.21; H, 7.53; H, 4.42.

The infrared spectrum of the compound (mineral oil mull) exhibited maxima at 3500, 1779, 1717, 1669, 1632, 1615, 1240, 1214, 1179, 1156, 1144, and 1065 reciprocal centimeters. The ultraviolet spectrum of the compound (ethanol solution) exhibited a maximum at 239 millimicrons ($\epsilon$=15,350). Using the above procedure, but replacing 17α - hydroxy - 6α-methyl-9β,11β-oxido-3,20-dioxo-1,4-pregnadiene-16α-acetic acid γ-lactone by 6α-methyl -17α-hydroxy-21-acetoxy-9β,11β-oxido-3,20-dioxo-1,4-pregnadiene-16α-acetic acid γ-lactone, there is obtained 6α - methyl - 9α - fluoro-11β,17α-dihydroxy-21-acetoxy-3,20-dioxo-1,4-pregnadiene-16α-acetic acid γ-lactone.

EXAMPLE 113

Using the procedure described in Example 59, but replacing Δ⁵-3β-acetoxy-2'-methyl-6'β-methoxy-5',6'-dihydroandrostano-[17,16α-c]-pyran by Δ⁴-9α-fluoro-3,11-diketo - 2' - acetoxymethyl-6'β-methoxy-5',6'-dihydroandrostano-[17,16α-c]-pyran, there are obtained 9α-fluoro-17α-hydroxy - 21-acetoxy-3,11,20-trioxopregn-4-ene-16α-acetic acid γ-lactone, 9α-fluoro-17α-hydroxy-21-acetoxy-3,11,20-trioxopregn-4-ene-16α-acetaldehyde γ-lactol, and 9α-fluoro-17α,20-dihydroxy-21 - acetoxy-3,11-dioxopregn-4-ene-16α-acetic acid γ-lactone.

EXAMPLE 114

Using the procedure described in Example 59, but replacing Δ⁵-3β-acetoxy-2'-methyl-6'β-methoxy-5',6'-dihydroandrostano-[17,16α-c]-pyran by Δ¹,⁴-9α-fluoro-3,11-diketo- 2'-acetoxymethyl-6'β-methoxy-5',6'-dihydroandrostano-[17,16α-c]-pyran, there are obtained 9α-fluoro-17α-hydroxy-21-acetoxy-3,11,20-trioxopregn-1,4 - diene - 16α - acetic acid γ-lactone, 9α-fluoro-17α-hydroxy-21-acetoxy-3,11,20-trioxopregn-1,4-diene-16α-acetaldehyde γ - lactol, and 9α - fluoro - 17α,20-dihydroxy-21-acetoxy-3,11-dioxopregn-1,4-diene-16α-acetic acid γ-lactone.

EXAMPLE 115

Using the procedure described in Example 59, but replacing Δ⁵ - 3β-acetoxy-2'-methyl-6'β-methoxy-5',6'-dihydroandrostano-[17,16α-c]-pyran by Δ⁴-9α-fluoro-3,11-diketo- 2'-methyl-6'β-methoxy-5',6'-dihydroandrostano-[17,16α-c]-pyran, there are obtained 9α-fluoro-17α-hydroxy-3,11,20-trioxopregn-4-ene-16α-acetic acid γ-lactone, 9α-fluoro-17α-hydroxy-3,11,20-trioxopregn-4-ene-16α-acetaldehyde γ-lactol, and 9α-fluoro-17α,20-dihydroxy-3,11-dioxopregn-4-ene-16α-acetic acid γ-lactone.

EXAMPLE 116

Using the procedure described in Example 59, but replacing Δ⁵ - 3β-acetoxy-2'-methyl-6'β-methoxy-5',6'-dihydroandrostano-[17,16α-c]-pyran by Δ¹,⁴-9α-fluoro-3,11-diketo-2'-methyl-6'β-methoxy - 5',6' - dihydroandrostano - [17,16α-c]-pyran, there are obtained 9α-fluoro-17α-hydroxy-3,11,20-trioxopregn-1,4-diene-16α-acetic acid γ-lactone, 9α - fluoro-17α-hydroxy-3,11,20-trioxopregna-1,4-diene-16α-acetaldehyde γ-lactol, and 9α-fluoro-17α,20-dihydroxy-3,11-dioxopregna-1,4-diene-16α-acetic acid γ-lactone.

EXAMPLE 117

*9α-fluoro-11β,17α-dihydroxy-6α-methyl-3,20-dioxo-1,4-pregnadiene-16α-acetaldehyde γ-lactol*

Using the procedure described in Example 111, but replacing 17α - hydroxy - 6α-methyl-3,20-dioxopregna-1,4,9 (11)-triene-16α-acetic acid γ-lactone by 17α-hydroxy-6α-methyl - 3,20 - dioxopregna-1,4,9(11)-triene-16α-acetaldehyde γ-lactol (prepared as described in Example 64), there was obtained 17α-hydroxy-6α-methyl-9β,11β-oxido-3,20-dioxo-1,4-pregna-diene-16α-acetaldehyde γ-lactol in the form of a crystalline solid.

Using the procedure described in Example 112, but replacing 17a - hydroxy - 6α-methyl-9β,11β-oxido-3,20-dioxo-1,4-pregnadiene-16α-acetic acid γ-lactone by the 17α-hydroxy-6α-methyl-9β,11β - oxido - 3,20 - dioxo - 1,4-pregnadiene-16α-acetaldehyde γ-lactol prepared as described above, there was obtained 9α-fluoro-11β,17α-dihydroxy-6α-methyl-3,20-dioxo-1,4-pregnadiene - 16α - acetaldehyde γ-lactol which after crystallization from a mixture of acetone and Skellysolve B had a melting point of 270 to 272° C.

*Analysis.*—Calcd. for $C_{24}H_{31}O_5F$: C, 68.90; H, 7.42; F, 4.54. Found: C, 68.41; H, 7.47; F, 4.57.

The infrared spectrum of this compound (mineral oil mull) exhibited maxima at 3510, 3380, 1685, 1655, 1600, 1575, 1242, 1223, 1196, 1160, 1091, 1073, 1053, 1020 and 1010 reciprocal centimeters in agreement with the structure.

I claim:

1. Δ¹,⁴,⁹⁽¹¹⁾-3-keto-6a,2'-dimethyl-6'β-methoxy - 5',6'-dihydroandrostano-[17,16a-c]-pyran.

2. Δ⁵-3β-acetoxy-2'-acetoxymethyl-6'β - methoxy - 5'-6'-dihydroandrostano-[17,16a-c]-pyran.

3. 17a-hydroxy-3,20-dioxopregn-4-ene-16a - acetic acid γ-lactone.

4. 17a-hydroxy-6a-methyl-3,20-dioxopregna - 1,4,9(11)-triene-16a-acetaldehyde γ-lactol.

5. 17a-hydroxy-6a-methyl-3,20-dioxopregna - 1,4,9(11)-triene-16a-acetic acid γ-lactone.

6. 17a-hydroxy-6a-methyl-3,20-dioxopregn-4 - ene - 16a-acetaldehyde γ-lactol.

7. 9a-fluoro-11β,17a-dihydroxy-6a-methyl - 3,20 - dioxo-1,4-pregnadiene-16a-acetic acid γ-lactone.

8. 9a-fluoro-11β,17a-dihydroxy-6a-methyl - 3,20 - dioxo-1,4-pregnadiene-16a-acetaldehyde γ-lactol.

9. A compound having the formula:

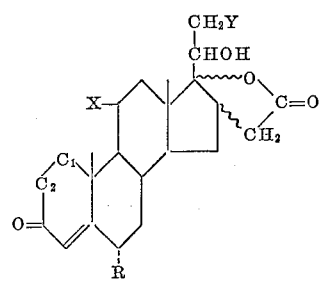

wherein R is selected from the class consisting of hydrogen and methyl, Y is selected from the class consisting of hydrogen, hydroxy, and acyloxy wherein the acyl radical is that of a hydrocarbon carboxylic acid containing from 1 to 12 carbon atoms, inclusive, X is an 11-substituent selected from the class consisting of hydrogen, keto, α-hydroxy, β-hydroxy, and a 9,11-double bond, and —C₁—C₂— is a divalent radical selected from the class consisting of —CH₂—CH₂— and —CH=CH—.

10. 17a,20-dihydroxy-6a-methyl - 3 - oxopregna - 1,4,9 (11)-triene-16a-acetic acid γ-lactone.

11. 17a,20-dihydroxy-6a-methyl - 3 - oxopregn - 4 - ene-16a-acetic acid γ-lactone.

12. A compound having the formula:

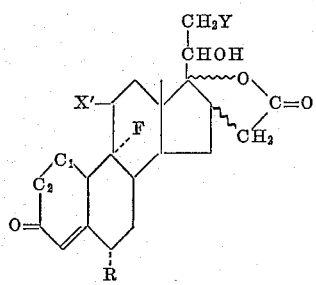

wherein R is selected from the class consisting of hydrogen and methyl, X' is selected from the class consisting of keto and β-hydroxy, Y is selected from the class consisting of hydrogen, hydroxy, and acyloxy wherein the acyl radical is that of a hydrocarbon carboxylic acid containing from 1 to 12 carbon atoms, inclusive, and —$C_1$—$C_2$— is a divalent radical selected from the class consisting of —$CH_2$—$CH_2$— and —CH=CH—.

13. 16a-(2-oxoethyl)-20-oxo-5-pregnene-3β-ol.

14. A dihydroandrostanopyran selected from the class consisting of compounds having the formulae:

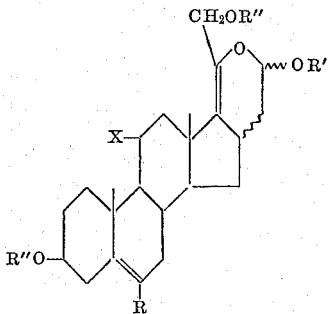

and

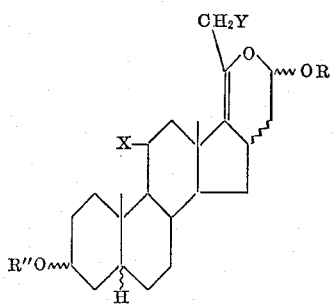

wherein R is selected from the class consisting of hydrogen and methyl, R' is lower-alkyl, R'' is selected from the class consisting of hydrogen and the acyl radical of a hydrocarbon carboxylic acid containing from 1 to 12 carbon atoms, inclusive, X is an 11-substituent selected from the class consisting of hydrogen, keto, a-hydroxy, β-hydroxy, and a 9,11-double bond, and Y is selected from the class consisting of hydroxy, and acyloxy wherein acyl has the significance above defined.

References Cited by the Examiner

UNITED STATES PATENTS 3,070,504   12/62   Cameron _____ 167—65

LEWIS GOTTS, *Primary Examiner.*